(12) United States Patent
Arita et al.

(10) Patent No.: US 9,761,205 B2
(45) Date of Patent: *Sep. 12, 2017

(54) MAP DISPLAY DEVICE AND MAP DISPLAY METHOD

(75) Inventors: Hidekazu Arita, Tokyo (JP); Mitsuo Shimotani, Tokyo (JP)

(73) Assignee: Mistubishi Electric Corporation, Tokyo (JP)

( * ) Notice: Subject to any disclaimer, the term of this patent is extended or adjusted under 35 U.S.C. 154(b) by 185 days.

This patent is subject to a terminal disclaimer.

(21) Appl. No.: 14/351,462

(22) PCT Filed: Jan. 12, 2012

(86) PCT No.: PCT/JP2012/050510
§ 371 (c)(1),
(2), (4) Date: Apr. 11, 2014

(87) PCT Pub. No.: WO2013/105250
PCT Pub. Date: Jul. 18, 2013

(65) Prior Publication Data
US 2014/0313229 A1    Oct. 23, 2014

(51) Int. Cl.
*G09G 5/377* (2006.01)
*G06T 11/60* (2006.01)
(Continued)

(52) U.S. Cl.
CPC ........... *G09G 5/377* (2013.01); *G01C 21/367* (2013.01); *G01C 21/3667* (2013.01);
(Continued)

(58) Field of Classification Search
CPC .... G06F 3/0484; G06F 3/0481; G06F 3/0488; G06F 17/30241; G06F 3/048; G06F 3/04847; G06F 3/041; G01C 21/367; G01C 21/3667; G09B 29/106; G06T 11/60; G06T 13/00; G06G 5/00; G09G 5/377
See application file for complete search history.

(56) References Cited

U.S. PATENT DOCUMENTS 8,489,641 B1 * 7/2013 Seefeld ............. G06F 17/30241
707/792
2004/0066316 A1    4/2004 Ogawa
(Continued)

FOREIGN PATENT DOCUMENTS

CN    1475773 A    2/2004
CN    101501449 A    8/2009
(Continued)

OTHER PUBLICATIONS

Microsoft Surface 2, URL: https://www.youtube.com/watch?v=0b8sHd5BKRs, 2011, pp. 5.*

*Primary Examiner* — Mark Zimmerman
*Assistant Examiner* — Phuc Doan
(74) *Attorney, Agent, or Firm* — Birch, Stewart, Kolasch & Birch, LLP

(57) ABSTRACT

A map display method display a plurality of drawing pictures. The device and the method facilitate comprehension of relevance between drawing objects included in the drawing pictures. The map display device includes an input/display unit receiving user operation input related to drawing picture display and displays a first drawing object related to map information in a first drawing picture and a second drawing object related to map relevant information in a second drawing picture; and a controller controlling an overlapping state between the first drawing picture and the second drawing picture in accordance with input of user operation received by the input/display unit and outputs, to the input/display unit, a picture in which one of the first and second drawing objects masks the other one in a portion where the first and second drawing pictures are overlapped with each other.

12 Claims, 18 Drawing Sheets

(51) Int. Cl.
*G06F 3/048* (2013.01)
*G01C 21/36* (2006.01)
*G09B 29/10* (2006.01)

(52) U.S. Cl.
CPC .............. *G06F 3/048* (2013.01); *G06T 11/60* (2013.01); *G09B 29/106* (2013.01)

(56) References Cited

U.S. PATENT DOCUMENTS

| | | | | |
|---|---|---|---|---|
| 2006/0125799 | A1* | 6/2006 | Hillis | G06F 3/011 345/173 |
| 2008/0051989 | A1* | 2/2008 | Welsh | G06T 11/00 701/532 |
| 2009/0009535 | A1 | 1/2009 | Iwamoto et al. | |
| 2010/0198501 | A1* | 8/2010 | Otani | G01C 21/3632 701/533 |
| 2011/0164062 | A1* | 7/2011 | Nakamura | G01C 21/3664 345/660 |
| 2011/0273473 | A1 | 11/2011 | Kim | |

FOREIGN PATENT DOCUMENTS

| | | |
|---|---|---|
| CN | 102197278 A | 9/2011 |
| DE | 69735874 T2 | 4/2007 |
| JP | 6-301505 A | 10/1994 |
| JP | 2001-174271 A | 6/2001 |
| JP | 2002-296046 A | 10/2002 |
| JP | 2005-257819 A | 9/2005 |
| JP | 2008-083108 A | 4/2008 |
| JP | 2010-190593 A | 9/2010 |
| JP | 2011-38970 A | 2/2011 |
| JP | 2011-169621 A | 9/2011 |

\* cited by examiner

F I G . 1
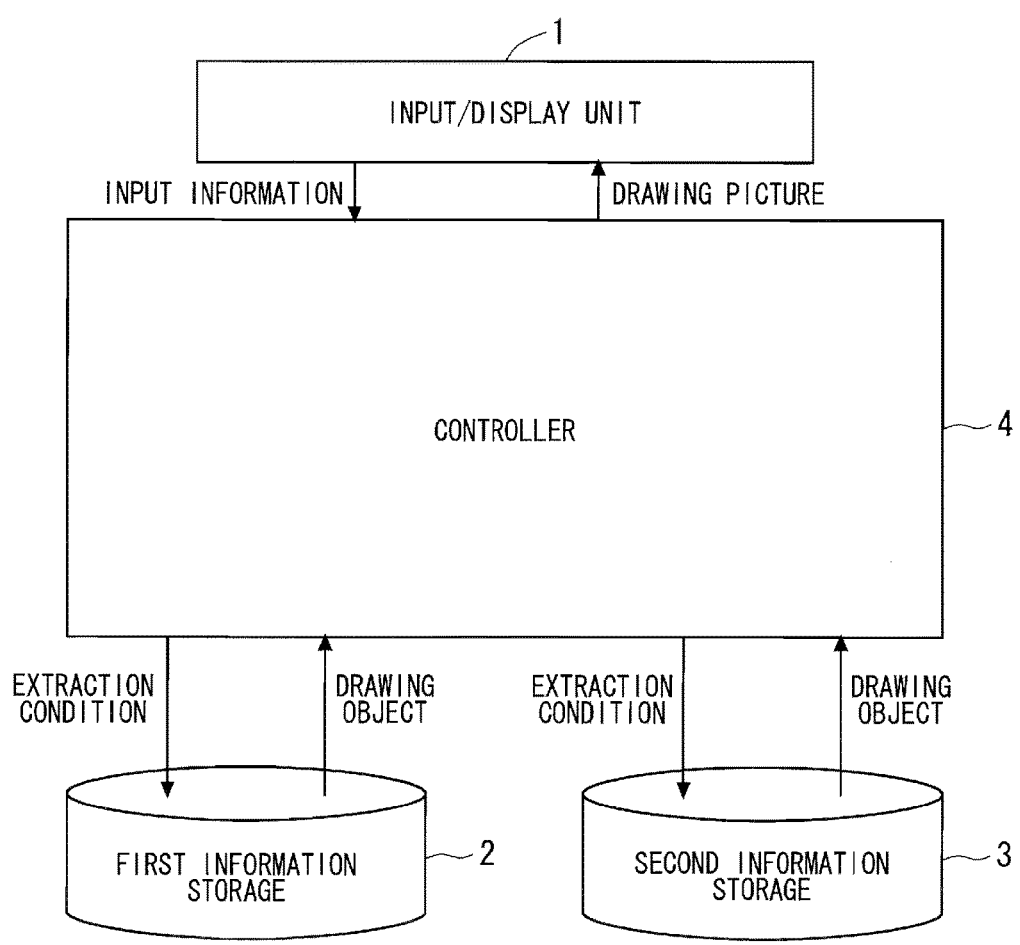

F I G. 4
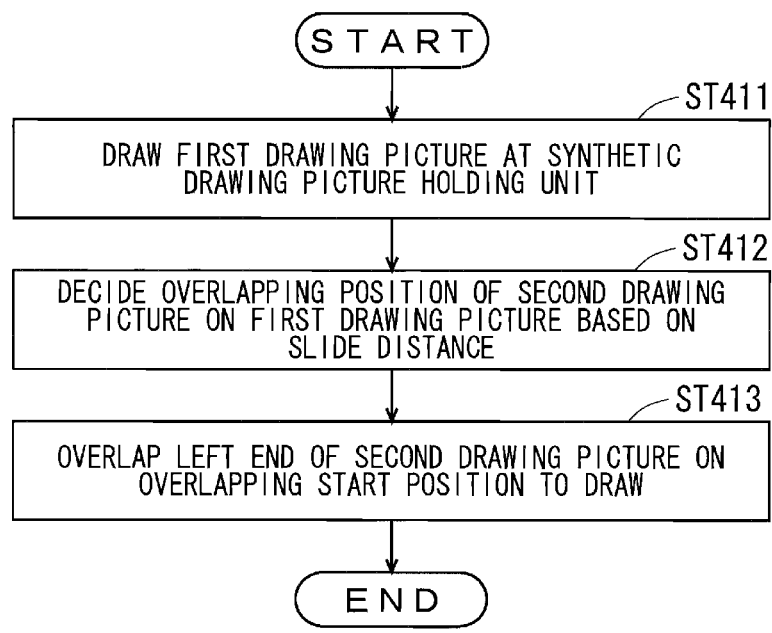

F I G . 1 1
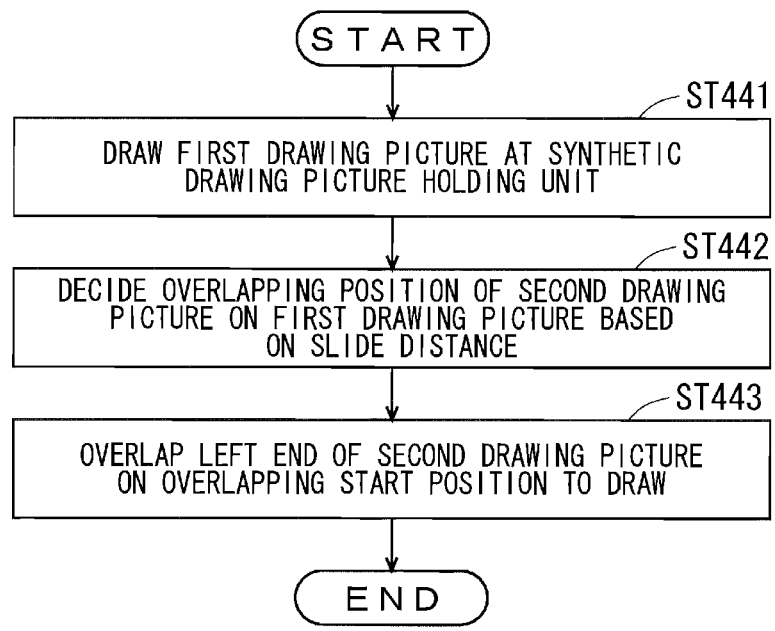

MAP DISPLAY DEVICE AND MAP DISPLAY METHOD

TECHNICAL FIELD

The present invention relates to a map display device and a map display method, and particularly relates to a map display device and a map display method that displays a plurality of drawing pictures on a display screen.

BACKGROUND ART

In an exemplary map display method of displaying a plurality of drawing pictures on a display screen, the display screen is divided into two regions and a map drawing picture around a current position of a vehicle or the like is displayed in each of the regions (see Patent Document 1). In the map drawing picture, a displayed map includes a drawing object such as a road line, a character, topography, a building, an icon, a background color (possibly a transparent or translucent color), or associated information. The display screen is a display that actually displays such map drawing pictures. The map drawing picture is displayed in a predetermined display region in the display screen.

According to this map display method, one of the display regions displays a map drawing picture related to route guide and the other one of the display regions displays a map drawing picture related to similar route guide on a different scale. Alternatively, either one of the display regions includes a map relevant drawing picture having a drawing object related to map relevant information. The map display method is thus useful for a user. Such map relevant information is information other than topography, administrative districts, buildings, roads, and the like, which are included in ordinary maps. The map relevant information is added so as to be associated with a position on a map.

In the map display method according to Patent Document 1, a boundary between right and left display regions can be varied to further enhance the convenience.

PRIOR ART DOCUMENT

Patent Document

Patent Document 1: Japanese Patent Application Laid-Open No. 2001-174271

SUMMARY OF INVENTION

Problems to be Solved by the Invention

There has been a problem that it is not always easy to comprehend relevance between the drawing objects displayed respectively in the plurality of drawing pictures that are displayed simultaneously in accordance with the map display method mentioned above.

For example, in a case where, out of the drawing pictures indicating the vehicle current position, one includes expressways and the other one includes ordinary roads, or in a case where one of the map drawing pictures is a planar map drawing picture and the other one is a map relevant drawing picture on traffic information in a peripheral region, a user has been required to compare display regions and determine in accordance with a landmark building or the like in order to comprehend how drawing objects in the drawing pictures respectively displayed in these display regions correspond to each other.

The present invention has been achieved to solve the above problems, and an object of the present invention is to provide a map display device and a map display method that displays a plurality of drawing pictures. The device and the method therefor can facilitate comprehension of relevance between drawing objects included respectively in the drawing pictures.

Means for Solving the Problems

An embodiment of the present invention provides a map display device that displays a plurality of drawing pictures including a first drawing picture and a second drawing picture in an at least partially overlapping manner, the first drawing picture displaying at least one first drawing object, the second drawing picture displaying at least one second drawing object, one of the first and second drawing objects including a drawing object related to map information and the other one including a drawing object related to map relevant information, and the first and second drawing pictures being equal or different in size, the map display device including: an input unit that receives input of user operation related to display of a drawing picture; and a controller that controls an overlapping state between the first drawing picture and the second drawing picture in accordance with input of user operation received by the input unit and outputs, to a display unit, a picture in which one of the first and second drawing objects masks the other one in a portion where the first drawing picture and the second drawing picture are overlapped with each other, and said controller slides one of said first and second drawing pictures relatively to the other one so as to successively change the overlapping state between said first and second drawing pictures.

The other embodiment of the present invention provides a map display device that displays a plurality of drawing pictures including a first drawing picture and a second drawing picture in an at least partially overlapping manner, the first drawing picture displaying at least one first drawing object, the second drawing picture displaying at least one second drawing object, one of the first and second drawing objects including a drawing object related to map information and the other one including a drawing object related to map relevant information, and the first and second drawing pictures being equal or different in size, the map display device including: an input unit that receives input of user operation related to display of a drawing picture; and a controller that controls an overlapping state between the first drawing picture and the second drawing picture in accordance with input of user operation received by the input unit and outputs, to a display unit, a picture in which one of the first and second drawing objects masks the other one in a portion where the first drawing picture and the second drawing picture are overlapped with each other, and said map display device is equipped on a mobile body, and each of said first drawing object and said second drawing object displays information related to one of a position on a map of said mobile body, a travel route of said mobile body, and a destination of said mobile body.

The other embodiment of the present invention provides a map display method of displaying a plurality of drawing pictures including a first drawing picture and a second drawing picture in an at least partially overlapping manner, the first drawing picture displaying at least one first drawing object, the second drawing picture displaying at least one second drawing object, one of the first and second drawing objects including a drawing object related to map information and the other one including a drawing object related to map relevant information, and the first and second drawing pictures being equal or different in size, the map display method including the steps of: (a) receiving input of user operation related to display of a drawing picture, (b) displaying the plurality of drawing pictures, and (c) prior to the step (b), controlling an overlapping state between the first drawing picture and the second drawing picture in accordance with input of user operation received in the step (a), and masking one of the first and second drawing objects with the other one in a portion where the first drawing picture and the second drawing picture are overlapped with each other, and in said step (c), one of said first and second drawing pictures is slid relatively to the other one so as to successively change the overlapping state between said first and second drawing pictures.

Effects of the Invention

An embodiment of the present invention provides a map display device that displays a plurality of drawing pictures including a first drawing picture and a second drawing picture in an at least partially overlapping manner, the first drawing picture displaying at least one first drawing object, the second drawing picture displaying at least one second drawing object, one of the first and second drawing objects including a drawing object related to map information and the other one including a drawing object related to map relevant information, and the first and second drawing pictures being equal or different in size, the map display device including: an input unit that receives input of user operation related to display of a drawing picture; and a controller that controls an overlapping state between the first drawing picture and the second drawing picture in accordance with input of user operation received by the input unit and outputs, to a display unit, a picture in which one of the first and second drawing objects masks the other one in a portion where the first drawing picture and the second drawing picture are overlapped with each other, and said controller slides one of said first and second drawing pictures relatively to the other one so as to successively change the overlapping state between said first and second drawing pictures. This configuration can facilitate comprehension of relevance between the drawing objects in drawing pictures.

The other embodiment of the present invention provides a map display device that displays a plurality of drawing pictures including a first drawing picture and a second drawing picture in an at least partially overlapping manner, said first drawing picture displaying at least one first drawing object, said second drawing picture displaying at least one second drawing object, one of said first and second drawing objects including a drawing object related to map information and the other one including a drawing object related to map relevant information, and said first and second drawing pictures being equal or different in size, an input unit that receives input of user operation related to display of a drawing picture; and a controller that controls an overlapping state between said first drawing picture and said second drawing picture in accordance with input of user operation received by said input unit and outputs, to a display unit, a picture in which one of said first and second drawing objects masks the other one in a portion where said first drawing picture and said second drawing picture are overlapped with each other, and said map display device is equipped on a mobile body, and each of said first drawing object and said second drawing object displays information related to one of a position on a map of said mobile body, a travel route of said mobile body, and a destination of said mobile body, and can facilitate comprehension of relevance between drawing objects included respectively in the drawing pictures.

The other embodiment of the present invention provides a map display method of displaying a plurality of drawing pictures including a first drawing picture and a second drawing picture in an at least partially overlapping manner, the first drawing picture displaying at least one first drawing object, the second drawing picture displaying at least one second drawing object, one of the first and second drawing objects including a drawing object related to map information and the other one including a drawing object related to map relevant information, and the first and second drawing pictures being equal or different in size, the map display method including the steps of: (a) receiving input of user operation related to display of a drawing picture, (b) displaying the plurality of drawing pictures, and (c) prior to the step (b), controlling an overlapping state between the first drawing picture and the second drawing picture in accordance with input of user operation received in the step (a), and masking one of the first and second drawing objects with the other one in a portion where the first drawing picture and the second drawing picture are overlapped with each other, and in said step (c), one of said first and second drawing pictures is slid relatively to the other one so as to successively change the overlapping state between said first and second drawing pictures. This configuration can facilitate comprehension of relevance between the drawing objects in drawing pictures.

The objects, features, aspects, and advantages of the present invention will be made more obvious with reference to the following detailed description and the accompanying drawings.

BRIEF DESCRIPTION OF DRAWINGS

FIG. 1 is a view showing a conceptual entire configuration of a map display device.

FIG. 4 is a flowchart illustrating behavior of the map display device.

FIG. 11 is a flowchart illustrating behavior of the map display device.

DESCRIPTION OF EMBODIMENTS

Embodiment 1

Configuration

Figure 2:
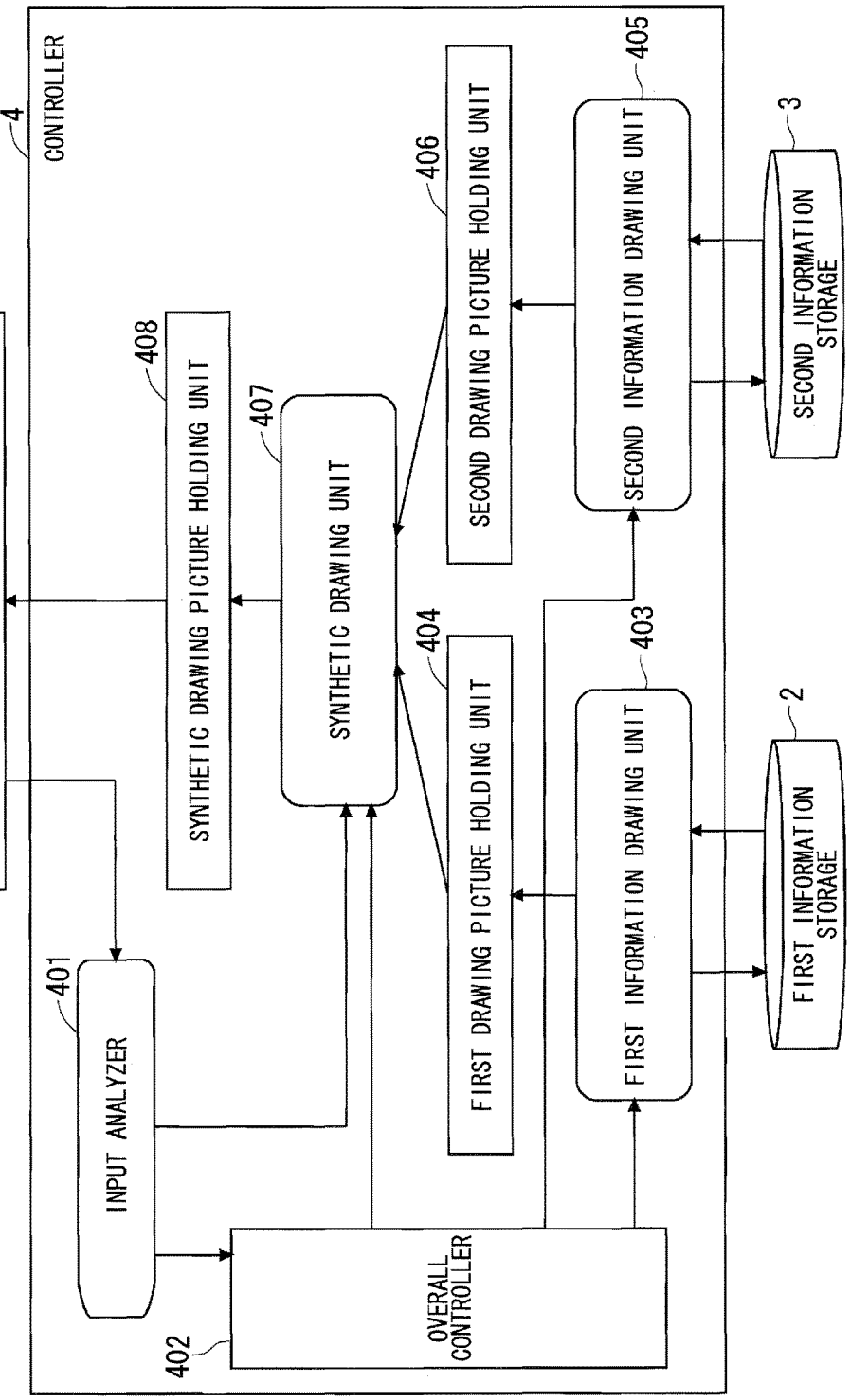
FIG. 2 is a view showing a conceptual configuration of a controller in the map display device.

A conceptual entire configuration of a map display device according to an embodiment 1 is described with reference to FIG. 1. The map display device is not particularly limited in terms of its purpose of use. The map display device according to the following embodiment described below is assumed to be a car navigation system equipped on a vehicle as a mobile body.

As shown in FIG. 1, the map display device includes an input/display unit 1, a controller 4, a first information storage 2, and a second information storage 3. The input/display unit 1 receives input information as intended by a user and displays the information. The controller 4 controls behavior of displaying a drawing picture at the input/display unit 1 in accordance with the input information received by the input/display unit 1. The first information storage 2 and the second information storage 3 each store a drawing object and the like related to map information or map relevant information to be referred to upon behavior control by the controller 4.

The drawing object is displayed in a drawing picture and includes a road line, a character, topography, a building, an icon, a background color (possibly a transparent or translucent color), associated information, or the like. The background color included in the drawing object (a background drawing object) is not necessarily painted uniformly but can have gradation or can be painted partially in a drawing picture.

The input/display unit 1 is embodied by a touch panel (a display device including a touch panel) or the like. The touch panel receives user's contact (touch) on a display screen and analyzes a touched position, a motion, and the like on the display screen to comprehend user's intention. Expected user's intention can be operation on a displayed drawing picture, a route search command, operation on built-in audio equipment, or the like. Examples of such operation to a drawing picture include changing a scale, changing a display position on a map (scrolling), searching for information on a current position and its periphery, and comparing the information.

The first information storage 2 and the second information storage 3 each store a drawing object related to map information or map relevant information, or the like. Specific examples of a drawing object related to map information include map data on topography or the like, road data associated with a corresponding position on the map, building data (a figure and a shape), and background color data. The building data includes a three-dimensional shape, a type, a name, and the like of the building itself. Specific examples of a drawing object related to map relevant information include traffic jam data, line data and the like. Either one of the storages can store either one of types of information. The information stored in each of the first information storage and the second information storage 3 is not limited to such a drawing object related to map information or map relevant information, but each of the first information storage and the second information storage 3 can store various information to be displayed at the input/display unit 1.

Each of the first information storage 2 and the second information storage 3 is specifically embodied by a hard disk drive, a memory card, a DVD, a Blu-ray Disc, or the like.

The controller 4 controls each functional unit included in the map display device and causes the input/display unit 1 to display a drawing picture. As shown in FIG. 1, the controller 4 analyzes user input information to form an extraction condition that relates to a drawing object related to map information or map relevant information and is necessary for formation of a drawing picture. In a case where the controller 4 analyzes input information to comprehend user's intention of "search for peripheral traffic jam information", the controller 4 is capable of forming a condition for extracting a drawing object of map information on ordinary roads around the current position and a drawing object of map relevant information on traffic jam around the current position.

The controller 4 further extracts a corresponding drawing object related to map information or map relevant information from each of the first information storage 2 and the second information storage 3 under the extraction condition, and causes the input/display unit 1 to display each of the extracted drawing objects in a desired mode. The controller 4 is specifically embodied by a computer (CPU) and a program thereof.

FIG. 2 particularly illustrates a detailed conceptual configuration of the controller 4 in the configuration of the map display device shown in FIG. 1.

The controller 4 includes an input analyzer 401, an overall controller 402, a first information drawing unit 403, a second information drawing unit 405, a first drawing picture holding unit 404, a second drawing picture holding unit 406, a synthetic drawing unit 407, and a synthetic drawing picture holding unit 408. The input analyzer 401 analyzes input information inputted from the input/display unit 1. The overall controller 402 controls the first information drawing unit 403, the second information drawing unit 405, and the synthetic drawing unit 407 in accordance with a result of the analysis by the input analyzer 401, and causes the input/display unit 1 to display a drawing picture. The first information drawing unit 403 extracts a first drawing object as a drawing object stored in the first information storage 2 and draws, at the first drawing picture holding unit 404, a first drawing picture as a drawing picture including the first drawing object. The second information drawing unit 405 extracts a second drawing object as a drawing object stored in the second information storage 3 and draws, at the second drawing picture holding unit 406, a second drawing picture as a drawing picture including the second drawing object. The first drawing picture holding unit 404 holds the first drawing picture. The second drawing picture holding unit 406 holds the second drawing picture. The synthetic drawing unit 407 draws, at the synthetic drawing picture holding unit 408, a synthetic drawing picture from the first drawing picture and the second drawing picture. The synthetic drawing picture holding unit 408 holds the synthetic drawing picture formed by the synthetic drawing unit 407. The input/display unit 1 displays, as a drawing picture, the synthetic drawing picture held in the synthetic drawing picture holding unit 408.

At least one of the first and second drawing objects includes a drawing object related to map information, while the other one can include a drawing object related to map relevant information.

The input analyzer 401 analyzes input information according to user's intention. More specifically, the input analyzer 401 analyzes a content displayed in a drawing picture and conditions such as a position touched on the display screen by a user and a motion, and identifies operation (e.g. equipment operation) according to the user's intention. User operation on the touch panel includes conventional simple touch operation of simply touching an icon (ordinary touch operation), or dynamic "gesture operation" such as "drag operation" or "flick operation" to be described later.

The overall controller 402 specifies a necessary drawing object related to map information or map relevant information on the basis of the analysis result, causes the first information drawing unit 403 to extract the first drawing object from the first information storage 2, and causes the second information drawing unit 405 to extract the second drawing object from the second information storage 3.

The first information drawing unit 403 forms a first drawing picture from the extracted first drawing object, and draws the first drawing picture at the first drawing picture holding unit 404 (memory).

The second information drawing unit 405 forms a second drawing picture from the extracted second drawing object, and draws the second drawing picture at the second drawing picture holding unit 406 (memory).

Each of the first information drawing unit 403 and the second information drawing unit 405 is capable of adding, to the corresponding drawing picture (the first drawing picture or the second drawing picture) thus formed, information generated in the device such as vehicle current position data or route data to a destination of the vehicle obtained by route search behavior, so as to draw at the corresponding drawing picture holding unit.

The overall controller 402 further causes the synthetic drawing unit 407 to synthesize the first drawing picture held in the first drawing picture holding unit 404 and the second drawing picture held in the second drawing picture holding unit 406 and draw at the synthetic drawing picture holding unit 408 (memory). The synthetic drawing picture is held in the synthetic drawing picture holding unit 408 (memory) and is then displayed at the input/display unit 1.

The synthetic drawing unit 407 forms the synthetic drawing picture by synthesizing the first drawing picture and the second drawing picture so as to be entirely or partially overlapped with each other while holding drawing contents of the first drawing picture and the second drawing picture. When the first drawing picture and the second drawing picture are overlapped with each other and displayed, a drawing object in an upper drawing picture masks a drawing object in a lower drawing picture (the drawing object in the lower drawing picture is not displayed because the drawing object in the upper drawing picture is displayed).

The drawing object in the upper overlapped drawing picture is typically visible in an overlapped portion. The drawing object in the lower drawing picture can be made visible by controlling an overlapping state. The "upper/lower" herein corresponds to the upper/lower direction along the normal line of a display screen and a closer side corresponds to the "upper" side. In fact, pieces of drawing picture data are overlapped conceptually.

The first drawing picture and the second drawing picture to be synthesized can have preset first and second attention points, respectively.

The first attention point and the second attention point are particularly paid attention in the drawing pictures by a user, and are subjectively defined as points to be compared when the user refers to both the first drawing picture and the second drawing picture. Examples of such points include a current position of a vehicle on a peripheral map of the vehicle and a position of a destination on a peripheral map of the destination.

The drawing objects displayed respectively in the drawing pictures to be synthesized can have predetermined relevance therebetween. Examples of such predetermined relevance include relationship between positions of the vehicle on the maps coinciding or being close to each other, relationship on a travel route between a vehicle current position and a destination or the like, and temporal relationship between a current travel route and a past travel record of the vehicle.

The order of overlapping drawing pictures can be decided in accordance with user's intention, e.g. for each combination of drawing objects. It is noted that the overlapping order is changeable at any time. Specific vertical relationship can be defined for specific combination.

Behavior

Behavior of the map display device according to the embodiment 1 is briefly described next.

In the map display device according to the present invention, a display position of an upper overlapped drawing picture is updated by predetermined operation and a drawing object in the upper drawing picture and a drawing object in a lower drawing picture are compared with each other, so as to easily comprehend relevance between the drawing objects in a plurality of drawing pictures. The controller 4, particularly the overall controller 402, controls each functional unit during the behavior.

The following description adopts a sliding method as a specific method of performing predetermined operation of updating a display position in the upper overlapped drawing picture. As described below, examples of the sliding method include a first method in which the entire upper overlapped drawing picture is shifted successively, in other words, the drawing object in the upper overlapped drawing picture is shifted in a slide direction in association with sliding, and a second method in which display of the drawing object in the upper overlapped drawing picture is partially switched and a display region of the upper overlapped drawing picture is successively changed (increased or decreased), in other words, only the region overlapped with the drawing object in the lower drawing picture is changed without changing the display position of the drawing object in the upper overlapped drawing picture. How to update the display position of the upper overlapped drawing picture can be changed by a mode of user operation to the display screen, presetting for combination of drawing pictures, or the like.

Figure 3:
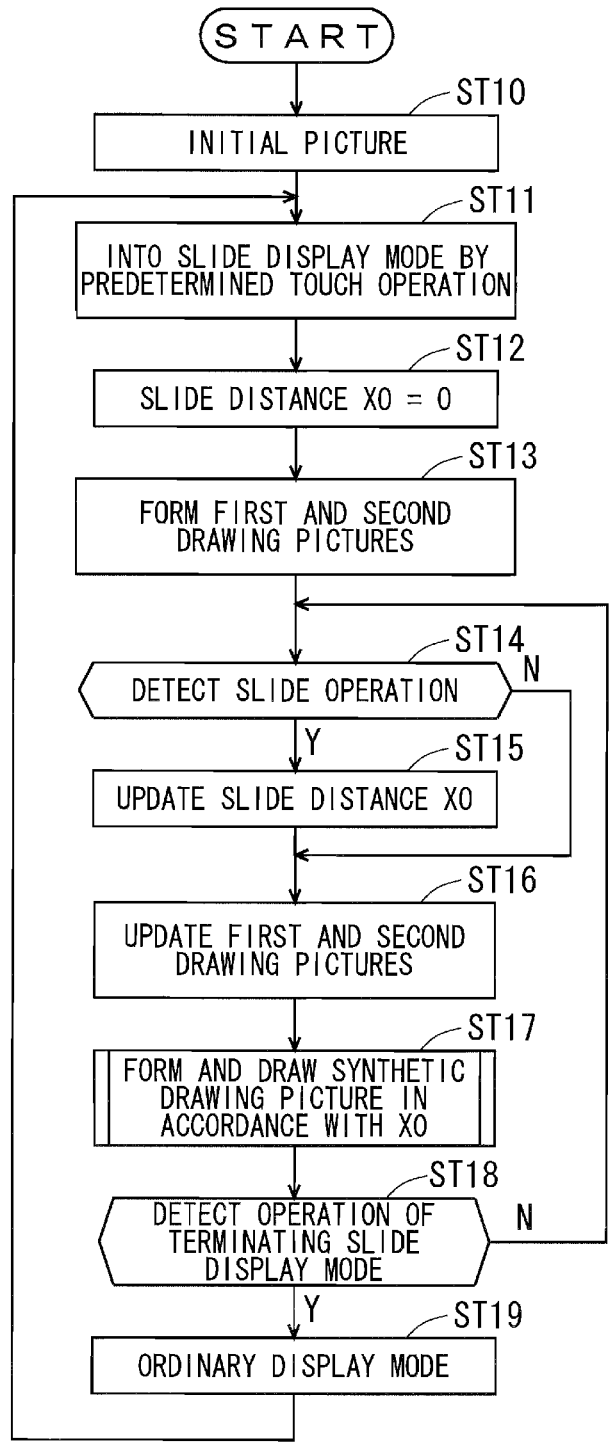
FIG. 3 is a flowchart illustrating behavior of the map display device.

Specific behavior is described with reference to FIG. 3.

Initially in step ST10, the map display device is turned on so as to cause the input/display unit 1 to display an initial picture. The initial picture can be in an ordinary display mode of receiving ordinary touch operation.

Then in step ST11, predetermined operation is applied to the initial picture at the input/display unit 1 so as to transition into a slide display mode. In the slide display mode, the display position of the upper overlapped drawing picture can be updated using the sliding method described above.

This transition can be performed by touch operation, button operation, icon operation, gesture operation, voice recognition, or the like to the initial picture.

Whether or not the mode has transitioned to the slide display mode can be checked by referring to a parameter that includes a type of the mode and is stored in the overall controller 402. For example, whether or not the slide display mode is selected can be determined on the basis of the fact that the parameter has a value larger or smaller than a predetermined threshold. The value of the parameter can be changed by user input, or can be changed automatically depending on preset conditions (including a state of the vehicle and a display state on the display screen). It will be usefully possible to easily check the mode if an icon or the like indicating whether or not this mode is selected is set to be displayed at the input/display unit 1.

When the display mode transitions to the slide display mode, a slide distance X0 is set to zero in step ST12.

Then in step ST13, a first drawing picture and a second drawing picture are formed. The first information drawing unit 403 and the second information drawing unit 405 form the pictures in accordance with user input information as described above. The first and second drawing pictures thus formed are drawn and held in the first drawing picture holding unit 404 and the second drawing picture holding unit 406, respectively.

Subsequently in step ST14, it is detected whether or not predetermined operation (slide operation) of updating the display position of the upper overlapped drawing picture is performed. The input analyzer 401 analyzes gesture operation or the like at the input/display unit 1 to detect such operation. The process proceeds to step ST15 if slide operation has been detected. In contrast, the process proceeds to step ST16 if slide operation has not been detected.

Then in step ST15, the slide distance X0 is updated in accordance with the slide operation.

Subsequently in step ST16, the drawing object displayed in each of the first drawing picture and the second drawing picture is updated. Updated in this case is the range of the periphery of the vehicle displayed in the drawing picture, or map information (including road data, building data, data containing a travel record, etc.) or map relevant information (including transportation facilities information, broadcast wave information, etc.) displayed as a drawing object, which are changed every moment due to travel of the vehicle, and the like.

Subsequently in step ST17, a display position of the upper overlapped drawing picture is decided on the basis of the slide distance X0, and a synthetic drawing picture is formed from the first drawing picture and the second drawing picture. The synthetic drawing picture is drawn, in other words, displayed, at the input/display unit 1. Details thereof are to be described later.

Then in step ST18, there is detected predetermined operation of terminating the slide display mode. The process proceeds to step ST19 if the operation has been detected. In contrast, the process returns to step ST14 if the operation has not been detected. The slide display mode can be terminated by touch operation, button operation, icon operation, gesture operation, voice recognition, or the like.

The display mode then transitions to the ordinary display mode in step ST19, and the process returns to step ST11.

Details of step ST17 are described next with reference to FIGS. 4 to 7. A synthetic drawing picture is formed in this step. Described is a case where the synthetic drawing picture is formed by, as the method of sliding the upper overlapped drawing picture, the first method (hereinafter, referred to as board slide) in which the entire upper overlapped drawing picture is shifted successively, in other words, the drawing object in the upper overlapped drawing picture is shifted in a slide direction in association with sliding. Particularly described is sliding out by means of board slide, more specifically, a case of employing the method in which the upper overlapped drawing picture is shifted to the outside of the display screen from a state where the drawing pictures are completely overlapped with each other (a completely overlapped state). It is assumed that the upper overlapped drawing picture corresponds to the second drawing picture in the following description. This positional relationship can be inverted.

Initially in step ST411, the first drawing picture held in the first drawing picture holding unit 404 is drawn at the synthetic drawing picture holding unit 408.

Figure 5:
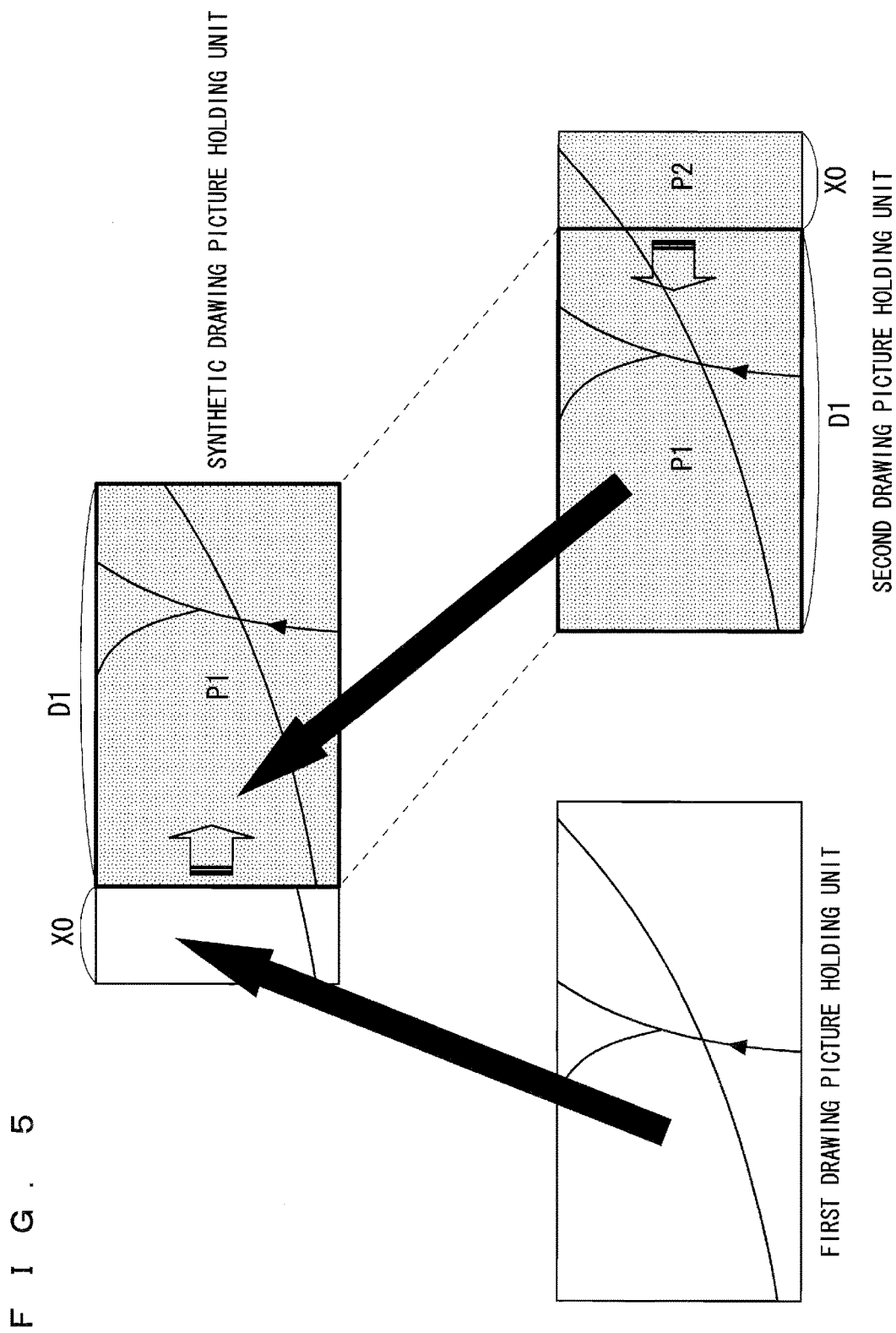
FIG. 5 is a view illustrating behavior of the map display device.
Figure 6:
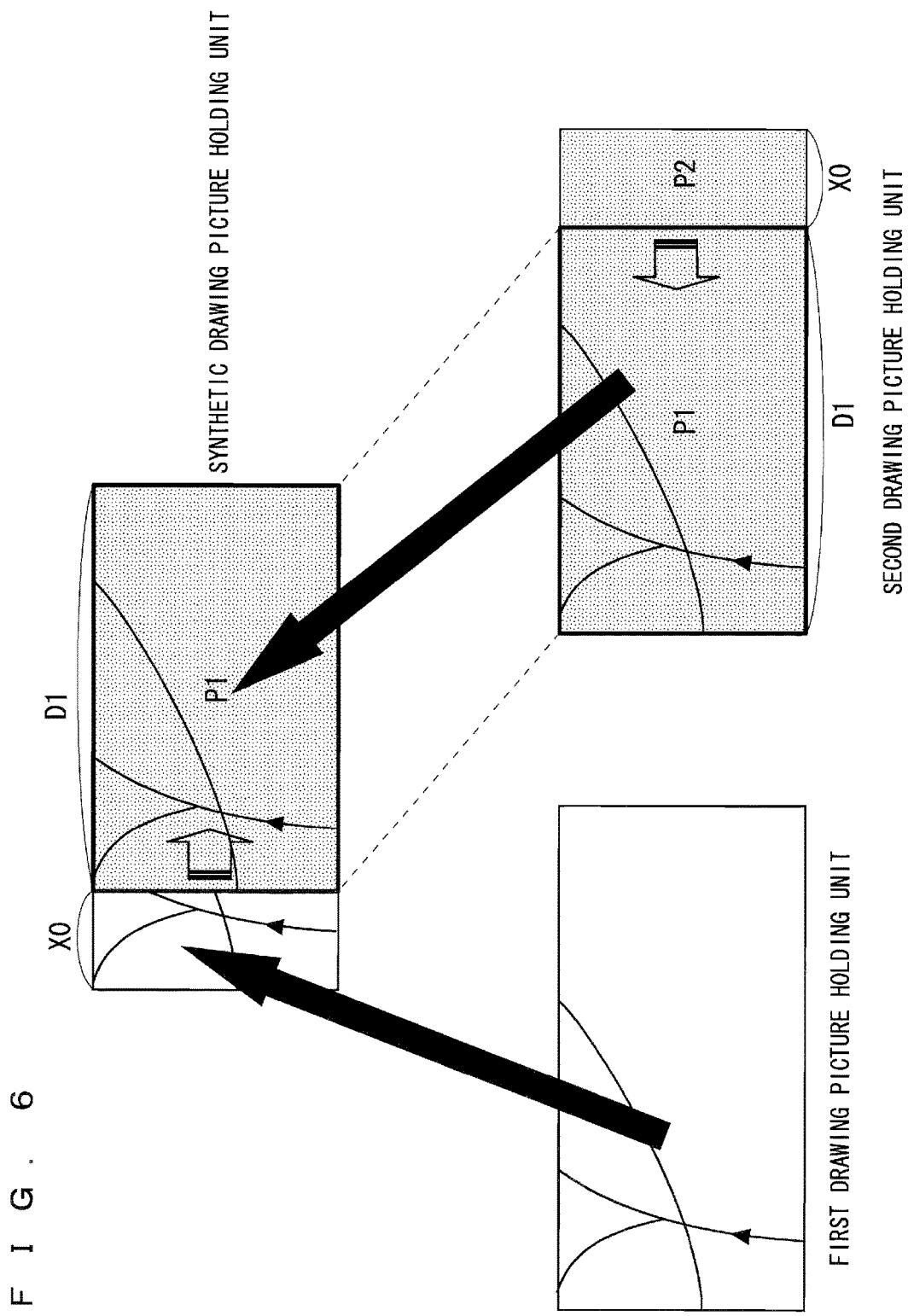
FIG. 6 is a view illustrating behavior of the map display device.

Subsequently in step ST412, an overlapping position of the second drawing picture on the first drawing picture is decided on the basis of the slide distance X0 updated in accordance with slide operation. FIGS. 5 and 6 schematically illustrate methods of synthesizing drawing pictures in cases where drawing objects are displayed at different positions in the drawing pictures.

If the slide distance X0 is zero, the first drawing picture and the second drawing picture are completely overlapped with each other and the second drawing object is positioned to completely mask the first drawing object. If attention points are set, the first drawing picture and the second drawing picture are preferably positioned so that a first attention point in the first drawing picture is overlapped and coincides with a second attention point in the second drawing picture on the display screen. In other words, when the first drawing picture and the second drawing picture each include a peripheral map of the vehicle, these drawing pictures are preferably located so that the current positions of the vehicle in these drawing pictures coincide with each other (furthermore, the first attention point and the second attention point are located at a common position on the map in this case).

If the slide distance X0 is updated to a value other than zero, the overlapping position of the second drawing picture on the first drawing picture is decided on the basis of a position on the display screen touched in user's gesture operation or the like and the slide distance X0 corresponding to the motion.

For example, an overlapping start position where an end of the second drawing picture is located is set with a shift distance from a position on the display screen initially touched by a user (the slide distance X0 in FIGS. 5 and 6) being considered as an offset. Such operation of shifting an upper overlapped drawing picture along with predetermined touch operation (e.g. shifting a finger in a direction on the display screen at predetermined or lower speed) is called drag operation, and a mode of performing this operation is called a drag mode.

For example, an overlapping start position where an end of the second drawing picture is located is set with a shift distance from a position on the display screen initially touched by a user (the slide distance X0 in FIGS. 5 and 6) being considered as an offset. The picture is returned to the original overlapping position prior to touching and shifting, simultaneously when the user terminates the operation of touching the display screen. Such operation of shifting an upper overlapped drawing picture along with predetermined touch operation (e.g. shifting a finger in a direction on the display screen at predetermined or lower speed) and returning to the original overlapping position simultaneously upon termination of the touch operation is called shutter operation, and a mode of performing this operation is called a shutter mode. Shutter operation and drag operation can be distinguished from each other on the basis of the number of fingers touching the display screen, for example.

In a case where a user touches the display screen and performs a motion like flicking a playing card (a motion like flipping), the overlapping start position of the second drawing picture is set with an amount increasing with time (the slide distance X0 in FIGS. 5 and 6 increasing with time) being considered as an offset. Such operation of shifting an upper overlapped drawing picture in a designated direction with predetermined touch operation and then shifting in accordance with predetermined inertia is called flick operation, and a mode of performing this operation is called a flick mode.

In the flick mode, flick operation is determined on the basis of any of the following conditions or by combination thereof, for example. (a) When a finger touches a touch panel and then quickly moves at predetermined or higher speed in a direction on the display screen, (b) when a finger presses the touch panel and then quickly moves with less press force at predetermined or higher speed in a direction on the display screen, or (c) when a finger touches the touch panel, then quickly moves at preliminarily predetermined or higher speed in a direction on the display screen, and is slightly released from the touch panel (in which case the touch panel is required to recognize a three-dimensional position).

The speed set as predetermined speed in each of the conditions (a) to (c) can be different from each other.

Then in step ST413, the second drawing picture is overlapped and drawn (overwriting data) in accordance with the overlapping position, more particularly, the overlapping start position. In a case where the second drawing picture is slid rightward out of the display screen, drawing is executed in the state where the second drawing picture is overlapped so that the left end thereof coincides with the overlapping start position.

A portion not overlapped with the first drawing picture (P2 in FIGS. 5 and 6) is not displayed on the display screen. In this state, the display screen displays the first drawing object in the first drawing picture having width equal to the slide distance X0 and not overlapped with the second drawing picture as well as the second drawing object in the second drawing picture having width D1 from the left end of the second drawing picture (P1 in FIGS. 5 and 6). The width D1 in FIGS. 5 and 6 corresponds in length to the width of the second drawing picture displayed in the synthetic drawing picture.

Figure 7:
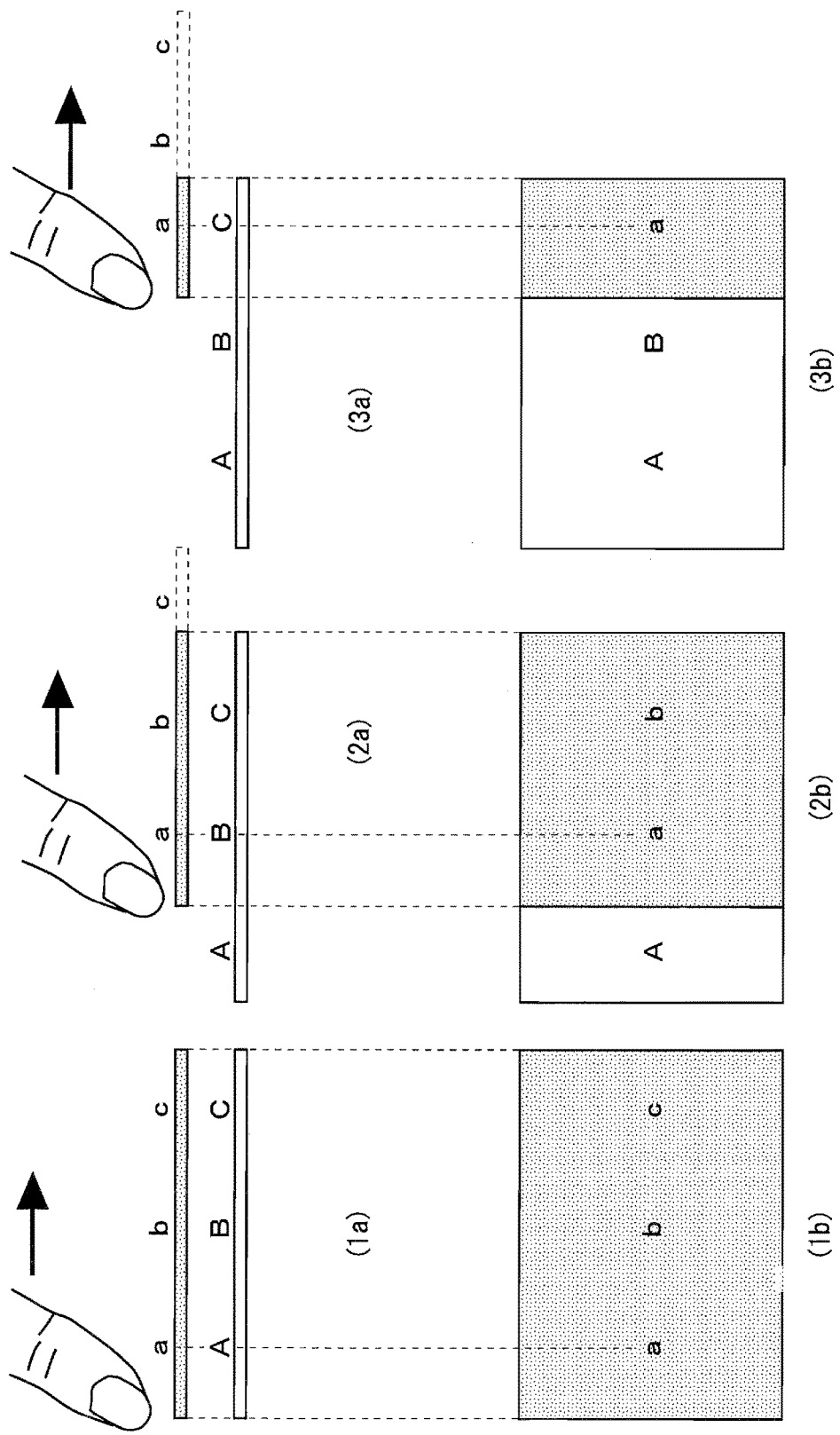
FIG. 7 shows views illustrating behavior of the map display device.

Sequentially forming a synthetic drawing picture as described above enables motions shown in FIG. 7 (sliding out by means of board slide). In FIG. 7, a second drawing picture including a drawing object a, a drawing object b, a drawing object c, and a second background drawing object is overlapped on a first drawing picture including a drawing object A, a drawing object B, a drawing object C, and a first background drawing object. It is assumed that the drawing object A is located at a first attention point in the first drawing picture and the drawing object a is located at a second attention point in the second drawing picture. The first background drawing object and the second background drawing object can be rectangular objects being equal in size to the drawing pictures and painted in cream. The drawing object a, the drawing object b, and the drawing object c are drawn on the second background drawing object in the second drawing picture.

In FIG. 7, portions (1a), (2a), and (3a) are pattern views of the lower first drawing picture and the upper second drawing picture seen in a lateral direction, whereas portions (1b), (2b), and (3b) are pattern views of the first drawing picture and the second drawing picture seen from above.

A user touches the input/display unit 1 with a finger and shifts the finger rightward in the figure (drag operation). In this case, the overlapping start position in the upper second drawing picture is updated sequentially (from 1a to 3a through 2a, or from 1b to 3b through 2b). The second drawing picture is displayed like being entirely placed on a board and slid (board slide).

More specifically, when the above slide motion is executed, the drawing objects a, b, and c in FIG. 7 are shifted rightward together with the second background drawing object like being placed on a board.

In the state of (1a) and (1b), the first drawing picture and the second drawing picture are completely overlapped with each other and the second background drawing object masks the drawing objects A, B, and C. If the second drawing picture is smaller than the first drawing picture, the second drawing picture has only to be overlapped on a region in the first drawing picture equal in size to the second drawing picture.

In the state of (2a) and (2b), the drawing object a and the drawing object b are displayed on the display screen, whereas the rightmost drawing object c is out of the display screen of the input/display unit 1 and is not displayed. The drawing object A is displayed. In contrast, the drawing object B is masked by the second background drawing object and is not displayed, and the drawing object C is masked by the second background drawing object and is not displayed. In a case where attention points are set, the drawing object A serving as a first attention point and the drawing object a serving as a second attention point are displayed close to each other. It is thus possible to easily comprehend the relevance between these drawing objects (see also FIG. 6). Furthermore, relative positional relationship between the upper second drawing picture and the lower first drawing picture is changing continually in this case.

In the state of (3a) and (3b), the upper second drawing picture shifts further rightward, and the drawing object b is also out of the display screen of the input/display unit 1 and is not displayed. The drawing object A and the drawing object B are displayed whereas the drawing object C is masked by the second background drawing object and is not displayed. Furthermore, relative positional relationship between the upper second drawing picture and the lower first drawing picture is changing continually in this case.

Figure 8:
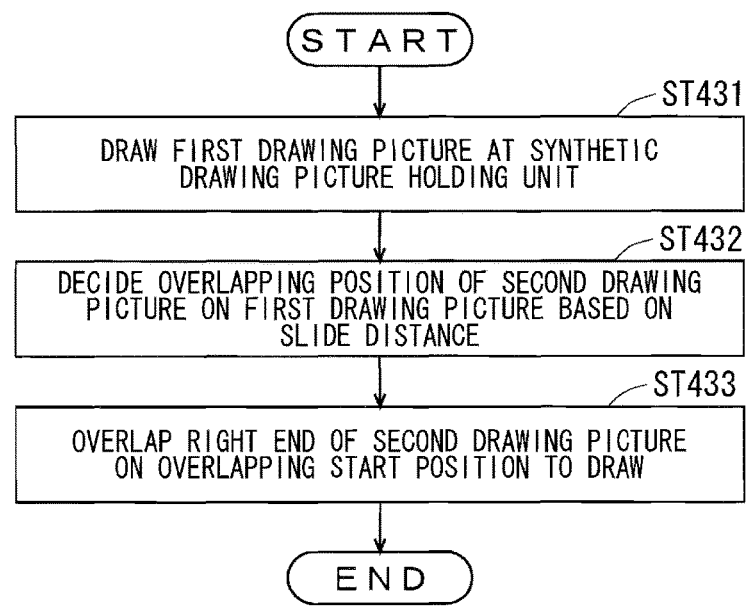
FIG. 8 is a flowchart illustrating behavior of the map display device.
Figure 9:
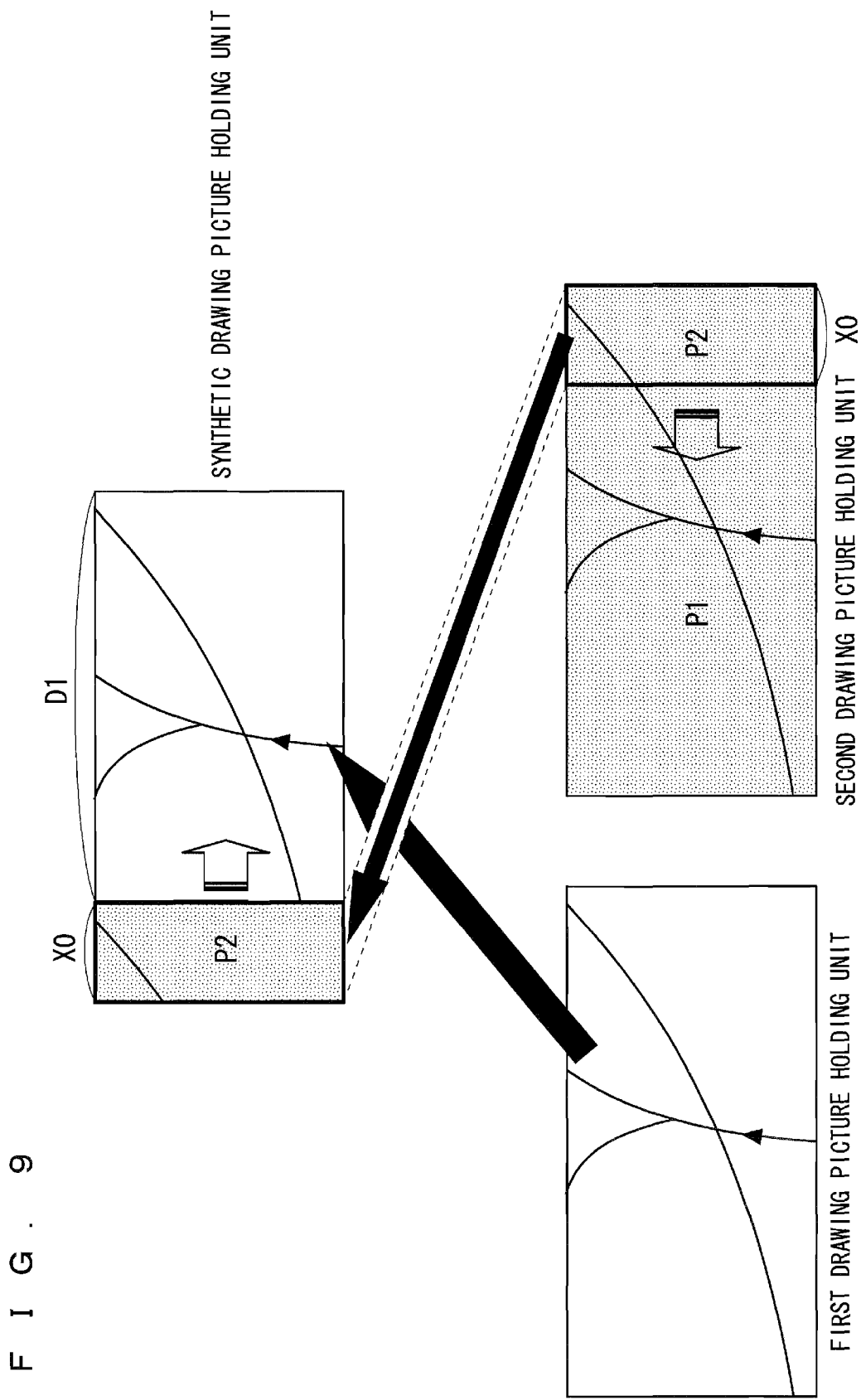
FIG. 9 is a view illustrating behavior of the map display device.
Figure 10:
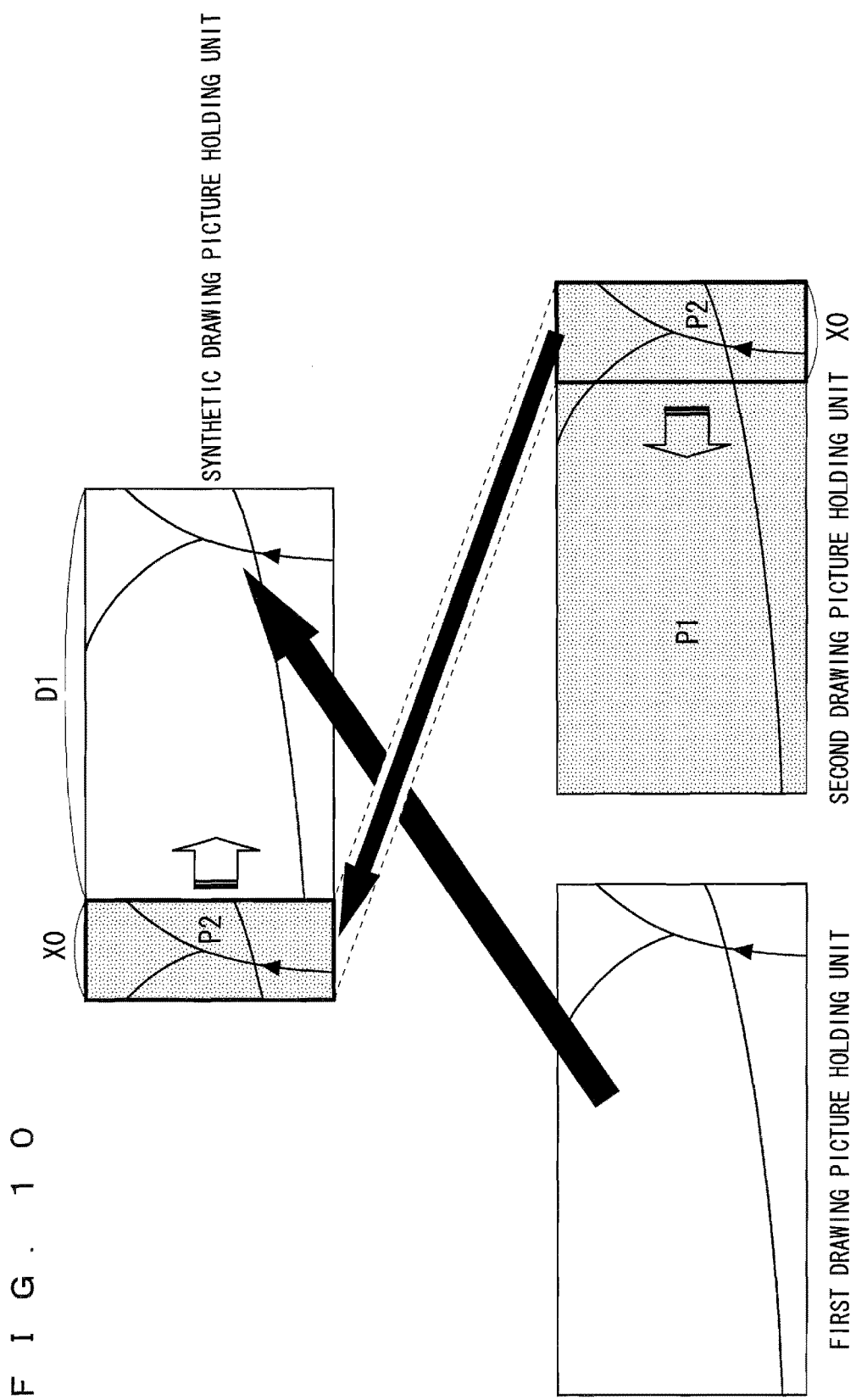
FIG. 10 is a view illustrating behavior of the map display device.

Described next with reference to FIGS. 8 to 10 is sliding in by means of board slide, more specifically, formation of a synthetic drawing picture by the method in which the upper overlapped drawing picture is shifted from the outside of the display screen from a state where the drawing pictures are not overlapped with each other (a completely displaced state) and the drawing pictures are eventually overlapped with each other (the completely overlapped state).

Initially in step ST431, the first drawing picture held in the first drawing picture holding unit 404 is drawn at the synthetic drawing picture holding unit 408.

Subsequently in step ST432, an overlapping position of the second drawing picture on the first drawing picture is decided on the basis of the slide distance X0 updated in accordance with slide operation. FIGS. 9 and 10 schematically illustrate methods of synthesizing drawing pictures in cases where drawing objects are displayed at different positions in the drawing pictures.

If the slide distance X0 is zero, for example, the second drawing picture is positioned so as to be completely out of the display screen.

If the slide distance X0 is updated to a value other than zero, the overlapping position of the second drawing picture on the first drawing picture is decided on the basis of a position on the display screen touched in user's gesture operation or the like and the slide distance X0 corresponding to the motion.

If attention points are set, the overlapping position of the second drawing picture on the first drawing picture is preferably decided so that a first attention point in the first drawing picture gradually approaches a second attention point in the second drawing picture as the slide distance X0 is updated.

Then in step ST433, the second drawing picture is overlapped and drawn in accordance with the overlapping position, more particularly, the overlapping start position In a case where the second drawing picture is slid from the left into the display screen, drawing is executed in the state where the second drawing picture is overlapped so that the right end thereof coincides with the overlapping start position.

A portion not overlapped with the first drawing picture (P1 in FIGS. 9 and 10) is not displayed on the display screen. In this state, the display screen displays the first drawing object in the first drawing picture having the width D1 not overlapped with the second drawing picture as well as the second drawing object in the second drawing picture having the width equal to the slide distance X0 from the right end of the second drawing picture (P2 in FIGS. 9 and 10).

Figure 12:
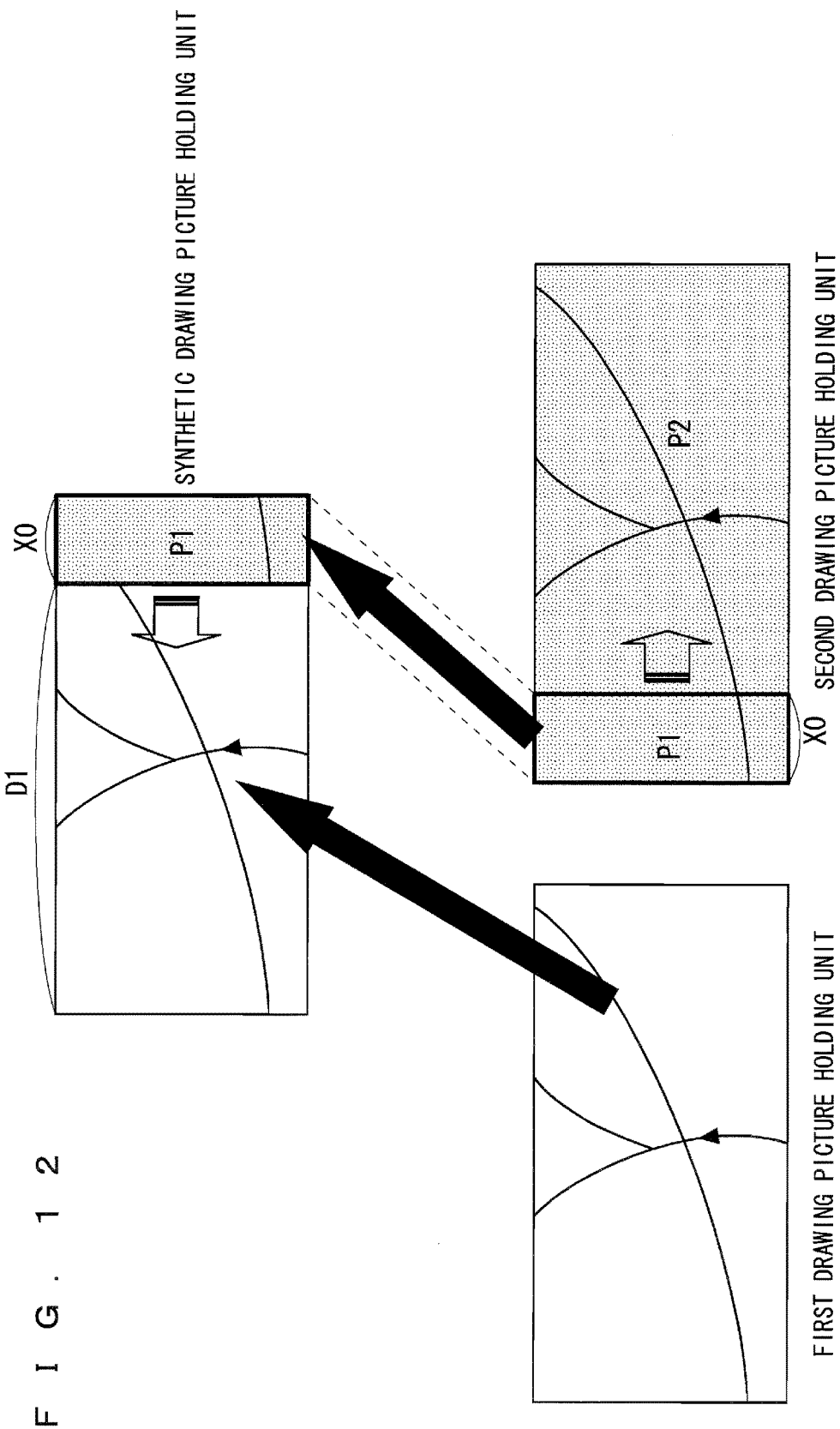
FIG. 12 is a view illustrating behavior of the map display device.
Figure 13:
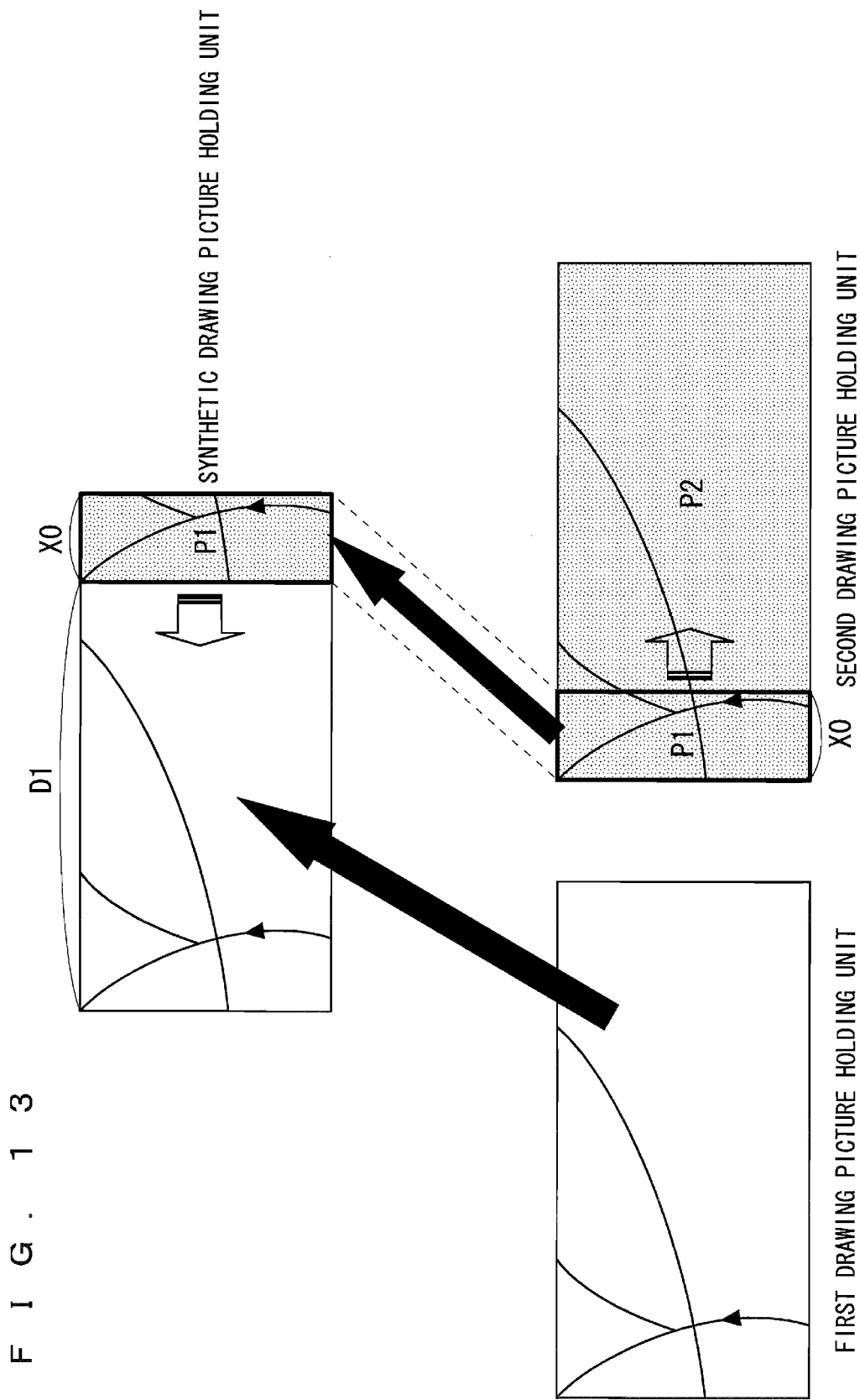
FIG. 13 is a view illustrating behavior of the map display device.

Sliding in by means of board slide from the opposite side as compared with the case of FIGS. 8 to 10 is described next with reference to FIGS. 11 to 13.

Initially in step ST441, the first drawing picture held in the first drawing picture holding unit 404 is drawn at the synthetic drawing picture holding unit 408.

Subsequently in step ST442, an overlapping position of the second drawing picture on the first drawing picture is decided on the basis of the slide distance X0 updated in accordance with slide operation. FIGS. 12 and 13 schematically illustrate methods of synthesizing drawing pictures in cases where drawing objects are displayed at different positions in the drawing pictures.

If the slide distance X0 is zero, for example, the second drawing picture is positioned so as to be completely out of the display screen. In this case, the second drawing picture is out of the display screen at the opposite (right) side to that shown in FIGS. 9 and 10.

If the slide distance X0 is updated to a value other than zero, the overlapping position of the second drawing picture on the first drawing picture is decided on the basis of a position on the display screen touched in user's gesture operation or the like and the slide distance X0 corresponding to the motion.

Then in step ST443, the second drawing picture is overlapped and drawn in accordance with the overlapping position, more particularly, the overlapping start position. In a case where the second drawing picture is slid from the right into the display screen, drawing is executed in the state where the second drawing picture is overlapped so that the left end thereof coincides with the overlapping start position.

A portion not overlapped with the first drawing picture (P2 in FIGS. 12 and 13) is not displayed on the display screen. In this state, the display screen displays the first drawing object in the first drawing picture having the width D1 not overlapped with the second drawing picture as well as the second drawing object in the second drawing picture having the width equal to the slide distance X0 from the left end of the second drawing picture (P1 in FIGS. 12 and 13). These drawing objects are displayed laterally opposite to those shown in FIGS. 9 and 10.

In the sliding method described above, the upper overlapped drawing picture is shifted and the visible range of the lower drawing picture is changed along with the shift. The sliding method is not limited to the cases described above, but can be possibly varied in many ways in terms of sliding directions, motions of the upper drawing picture upon sliding, and the like.

Figure 14:
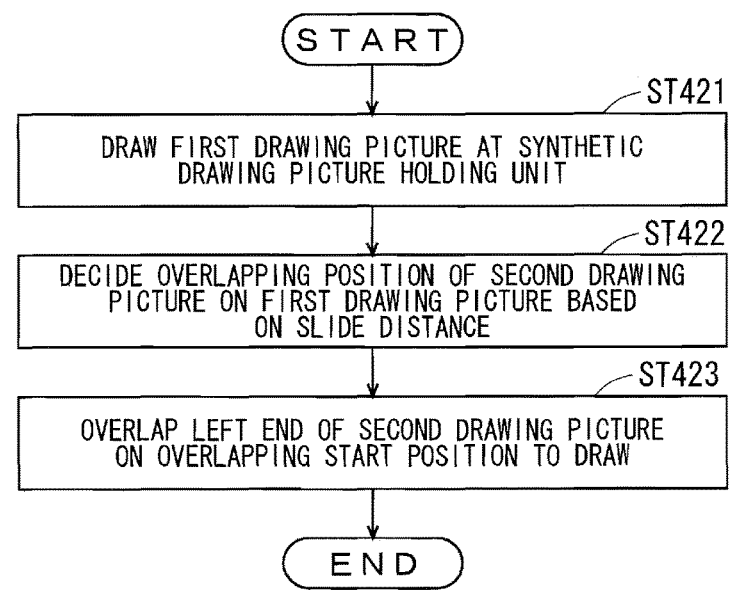
FIG. 14 is a flowchart illustrating behavior of the map display device.
Figure 15:
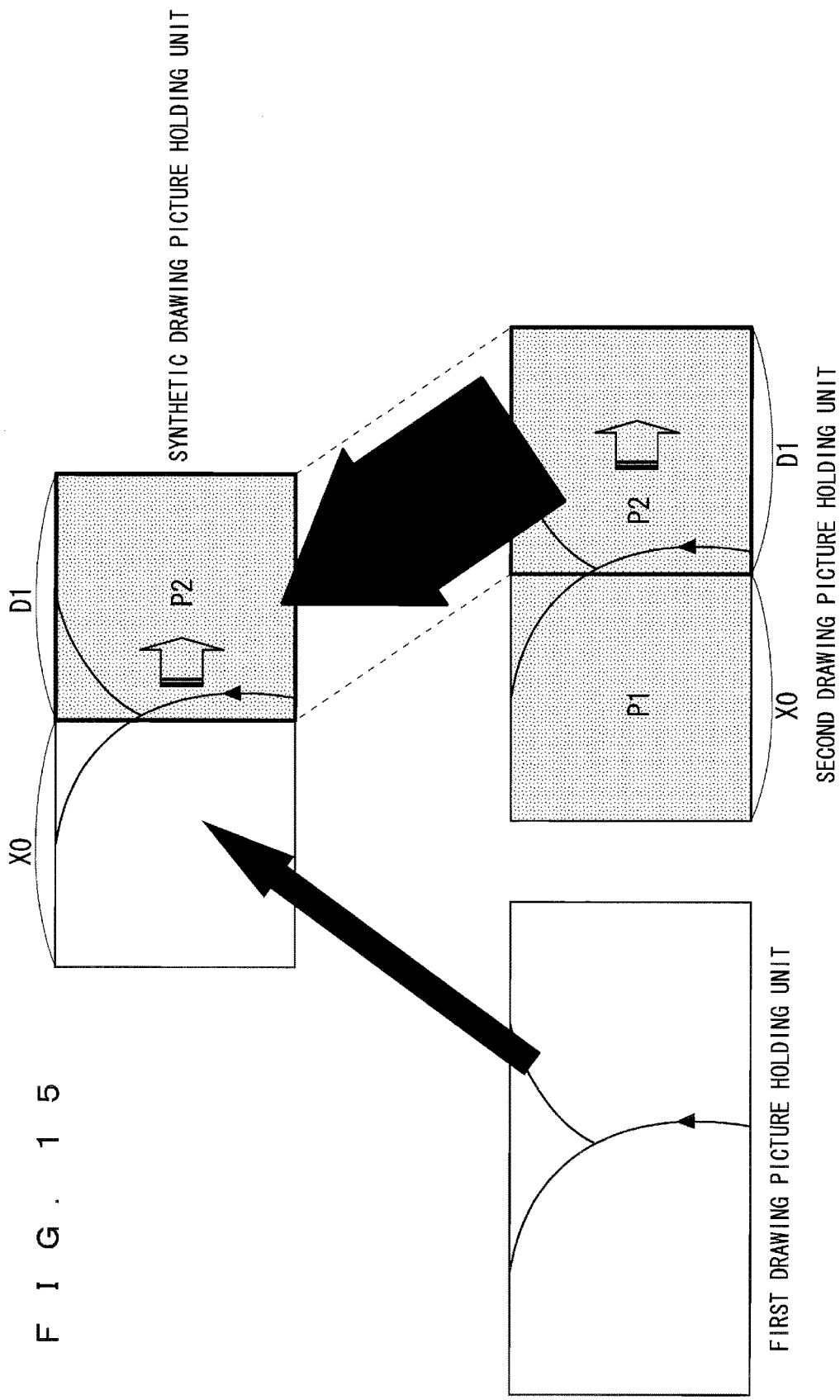
FIG. 15 is a view illustrating behavior of the map display device.

Details of step ST17 in another sliding method are described with reference to FIGS. 14 to 16. A synthetic drawing picture is formed in this step. Described below is formation of the synthetic drawing picture employing, as the method of sliding the upper overlapped drawing picture, the second method (hereinafter, referred to as curtain slide) in which display of the drawing object in the upper overlapped drawing picture is partially switched and the display region of the upper overlapped drawing picture is successively changed (increased or decreased), in other words, only the region overlapped with the drawing object in the lower drawing picture is changed without changing the display position of the drawing object in the upper overlapped drawing picture. Particularly described is sliding out by means of curtain slide, more specifically, a case of employing the method in which the upper overlapped drawing picture is successively removed while keeping its position from the state where the drawing pictures are overlapped with each other (the completely overlapped state) so as to increase the display region of the lower drawing picture. It is assumed that the upper overlapped drawing picture corresponds to the second drawing picture in the following description. This positional relationship can be inverted.

Initially in step ST421, the first drawing picture held in the first drawing picture holding unit 404 is drawn at the synthetic drawing picture holding unit 408.

Subsequently in step ST422, an overlapping position of the second drawing picture on the first drawing picture is decided on the basis of the slide distance X0 updated in accordance with slide operation.

If the slide distance X0 is zero, the first drawing picture and the second drawing picture are completely overlapped with each other and the second drawing object is positioned to completely mask the first drawing object. If attention points are set, the first drawing picture and the second drawing picture are preferably positioned so that a first attention point in the first drawing picture is overlapped and coincides with a second attention point in the second drawing picture on the display screen. In other words, when the first drawing picture and the second drawing picture each include a peripheral map of the vehicle, these drawing pictures are preferably positioned so that the current positions of the vehicle in these drawing pictures coincide with each other.

If the slide distance X0 is updated to a value other than zero, the overlapping position of the second drawing picture on the first drawing picture is decided on the basis of a position on the display screen touched in user's gesture operation or the like and the slide distance X0 corresponding to the motion.

For example, an overlapping start position where a gradually removed end of the second drawing picture is located is set with a shift distance from a position on the display screen initially touched by a user (the slide distance X0 in FIG. 15) being considered as an offset. Such operation of shifting an upper overlapped drawing picture along with predetermined touch operation (e.g. shifting a finger in a direction on the display screen at predetermined or lower speed) is called drag operation, and a mode of performing this operation is called a drag mode.

For example, an overlapping start position where an end of the second drawing picture is located is set with a shift distance from a position on the display screen initially touched by a user (the slide distance X0 in FIG. 15) being considered as an offset. The picture is returned to the original overlapping position prior to touching and shifting, simultaneously when the user terminates the operation of touching the display screen. Such operation of shifting an upper overlapped drawing picture along with predetermined touch operation (e.g. shifting a finger in a direction on the display screen at predetermined or lower speed) and returning to the original overlapping position simultaneously upon termination of the touch operation is called shutter operation, and a mode of performing this operation is called a shutter mode. Shutter operation and drag operation can be distinguished from each other on the basis of the number of fingers touching the display screen, for example.

In a case where a user touches the display screen and performs a motion like flicking a playing card (a motion like flipping), the overlapping start position of the second drawing picture is set with an amount increasing with time (the slide distance X0 in FIG. 15 increasing with time) being considered as an offset. Such operation of shifting an upper overlapped drawing picture in a designated direction with predetermined touch operation and then shifting in accordance with predetermined inertia is called flick operation, and a mode of performing this operation is called a flick mode.

Then in step ST423, the second drawing picture is overlapped and drawn in accordance with the overlapping position, more particularly, the overlapping start position. In a case where the second drawing picture is slid rightward out of the display screen, drawing is executed in the state where the second drawing picture is overlapped so that the gradually removed left end thereof coincides with the overlapping start position. In other words, the position of the second drawing picture coinciding with the overlapping start position is offset from the left end of the second drawing picture by the slide distance X0.

A portion removed from the first drawing picture (P1 in FIG. 15) is not displayed on the display screen. In this state, the display screen displays the first drawing object in the first drawing picture having width equal to the slide distance X0 and not overlapped with the second drawing picture as well as the second drawing object in the second drawing picture having the width D1 from the right end of the second drawing picture (P2 in FIG. 15).

Sequentially forming a synthetic drawing picture as described above enables motions shown in FIG. 16 (sliding out by means of curtain slide). In FIG. 16, a second drawing picture including a drawing object a, a second drawing object b, and a drawing object c is overlapped on a first drawing picture including a drawing object A, a drawing object B, and a drawing object C. It is assumed that the drawing object B is located at a first attention point in the first drawing picture and the drawing object b is located at a second attention point in the second drawing picture. The first background drawing object and the second background drawing object can be rectangular objects being equal in size to the drawing pictures and painted in cream. The drawing object a, the drawing object b, and the drawing object c are drawn on the second background drawing object in the second drawing picture.

Figure 16:
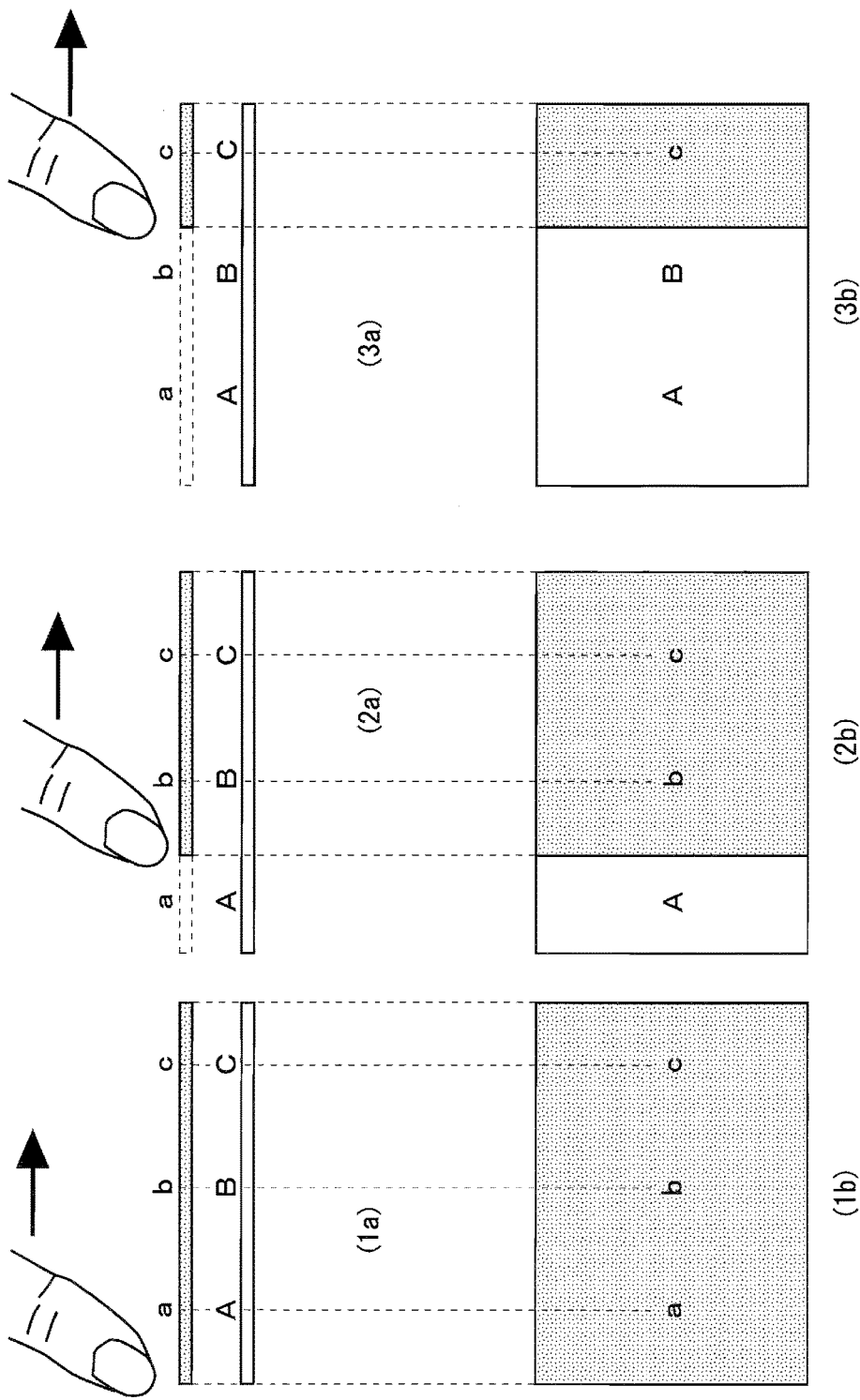
FIG. 16 shows views illustrating behavior of the map display device.

In FIG. 16, portions (1a), (2a), and (3a) are pattern views of the lower first drawing picture and the upper second drawing picture seen in a lateral direction, whereas portions (1b), (2b), and (3b) are pattern views of the first drawing picture and the second drawing picture seen from above.

A user touches the input/display unit 1 with a finger and shifts the finger rightward in the figure (drag operation). In this case, the overlapping start position in the upper second drawing picture is updated sequentially (from 1a to 3a through 2a, or from 1b to 3b through 2b). The second drawing picture is displayed while being slid successively like pulling a curtain (curtain slide), maintaining its display position.

In the state of (1a) and (1b), the first drawing picture and the second drawing picture are completely overlapped with each other and the second background drawing object masks the drawing objects A, B, and C. If the second drawing picture is smaller than the first drawing picture, the second drawing picture has only to be overlapped on a region in the first drawing picture equal in size to the second drawing picture.

In the state of (2a) and (2b), the drawing object b and the drawing object c are displayed on the display screen, whereas the leftmost drawing object a is removed from the display screen of the input/display unit 1 and is not displayed. The drawing object A is displayed. In contrast, the drawing object B is masked by the second background drawing object and is not displayed, and the drawing object C is masked by the second background drawing object and is not displayed. Furthermore, relative positional relationship between the upper second drawing picture and the lower first drawing picture is fixed. In other words, the first attention point and the second attention point always coincide with each other on the display screen.

In the state of (3a) and (3b), the upper second drawing picture is removed further to the right, and the drawing object b is also removed from the display screen of the input/display unit 1 and is not displayed. The drawing object A and the drawing object B are displayed whereas the drawing object C is masked by the second background drawing object and is not displayed. In a case where attention points are set, the drawing object B serving as a first attention point is displayed at a position of the removed drawing object b serving as a second attention point. It is thus possible to easily comprehend the relevance between these drawing objects (see also FIG. 15). Furthermore, relative positional relationship between the upper second drawing picture and the lower first drawing picture is fixed.

The second background drawing object is assumed to be in plain cream. If there is gradation in color in FIG. 16 such that the drawing object a and its vicinity is in cream and the drawing object c and its vicinity is in pink, the portion in the vicinity of the drawing object c in each of portions (1a), (2a), and (3a) has a drawing background color close to uniform pink.

In the sliding method described above, display is successively switched while the display position of the upper overlapped drawing picture is kept, and its display region is changed so as to change the visible range of the lower drawing picture. The sliding method is not limited to the cases described above, but can be possibly varied in many ways in terms of changing directions (e.g. expanding radially from a touched position), manners of displaying the upper drawing picture upon switching the display (e.g. blinking or fading), and the like.

The sliding method described above enables slide operation regardless of the position operated with touching or the like by a user in the display area of the second drawing picture. There can be alternatively limitation to the display range of the second drawing picture for accepting slide operation. For example, sliding of the second drawing picture can be acceptable when sliding gesture is performed in the vicinity of a boundary of the displayed second drawing picture.

The area accepting slide operation in the second drawing picture can be displayed by means of an icon or the like. In this case, it is possible to accept all of drag operation, flick operation, and transition of ordinary operation by simple touch operation. This leads to provision of a device of fine usability.

In the above example, the second background drawing object is assumed to be equal in size to the drawing picture, be in cream, and have a rectangular shape. The second background drawing object is not limited to the rectangular shape but can have a trapezoidal shape, have an elliptical shape, or be punched. Its color is not limited to a light color, but the second background drawing object can have gradation or a pattern, which enables display excellent in design for a user.

In the above example, the first information storage 2 and the second information storage 3 store the first drawing object and the second drawing object, respectively. The overall controller 402 can alternatively generate both or either one of the drawing objects through software processing. For example, the overall controller 402 can generate a sign indicating the position of its own car in accordance with a program. The overall controller 402 can alternatively generate both or either one of the background drawing objects through software processing.

The above example refers to the method of rendering in the drawing picture the background drawing object as a rectangular drawing object. The method of generating a background drawing object is not limited to this method. In a case where the drawing picture itself has a function of generating a background color corresponding to a background drawing object, the overall controller 402 can set the background color of each of the first drawing picture holding unit 404 and the second drawing picture holding unit 406 through software processing.

In another case where the synthetic drawing unit 407 inputs setting of a background color of each of the first drawing picture and the second drawing picture to generate a synthetic drawing picture in accordance with the hardware structure or software processing, the overall controller 402 can set the background color of each of these drawing pictures through software processing.

A drawing object in the present invention has a concept including an object eventually displayed at the input/display unit 1 through software processing mentioned above.

SPECIFIC EXAMPLES

Described below is behavior in accordance with the above sliding method according to specific examples. Any other method such as curtain slide is applicable to the case where board slide is illustrated in the specific example.

Figure 17:
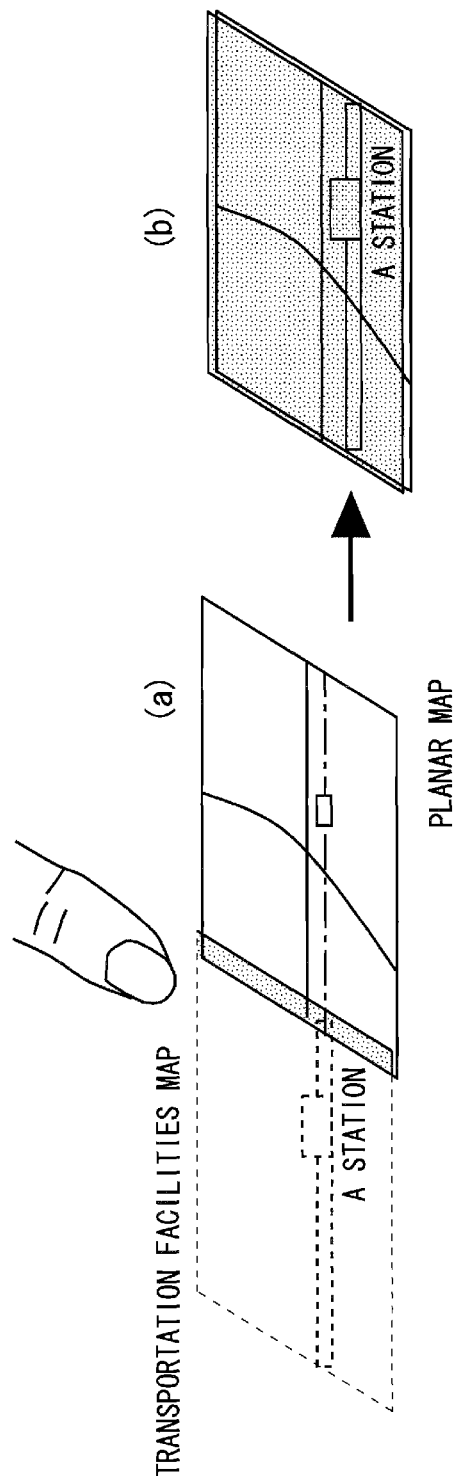
FIG. 17 is a view illustrating behavior according to a specific example, of the map display device.

In FIG. 17, a first drawing picture is a planar road map, and a second drawing picture (having a transparent background color in the figures) is a transportation facilities map displaying peripheral transportation facilities. The transportation facilities map is overlapped on the planar map (a portion (a) of FIG. 17). The second background drawing object is transparent in this example, although the second background drawing object in the figures is colored in order to clarify the difference from the first background drawing object.

By touching the transportation facilities map and shifting a finger on the display screen, it is possible to slide the transportation facilities map (sliding in by means of board slide) as well as mask a drawing object in the planar map with a drawing object in the transportation facilities map (a portion (b) of FIG. 17). Achieved this manner is map display of overlapping drawing objects of a railroad track and a station and highlighting the drawing objects related to the railroad.

If the planar map corresponds to the entire display screen in the state of a portion (a) of FIG. 17, the transportation facilities map can be located outside the display screen so as not to be completely displayed. If the right end portion of the transportation facilities map is displayed at the left end portion of the planar map by predetermined operation such as voice recognition, the sliding method described above can be easily applied using the portion.

Figure 18:
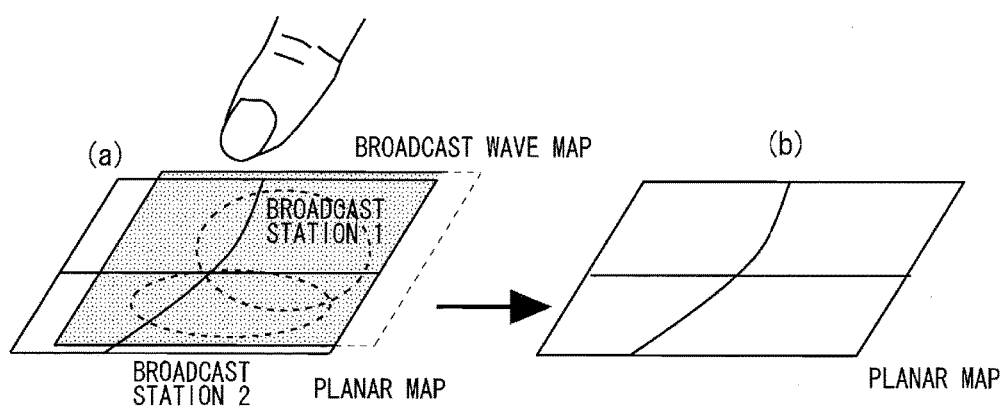
FIG. 18 is a view illustrating behavior according to a specific example, of the map display device.

In FIG. 18, a first drawing picture is a planar road map, and a second drawing picture (having a transparent background color in the figures) is a broadcast wave map displaying peripheral broadcast wave regions (including wave regions of terrestrial digital broadcasting, wireless LANs, mobile phones, etc). The broadcast wave map is overlapped on the planar map (a portion (a) of FIG. 18). The second background drawing object is transparent in this example, although the second background drawing object in the figures is colored in order to clarify the difference from the first background drawing object.

By touching the broadcast wave map and shifting a finger on the display screen, it is possible to slide the broadcast wave map (sliding out by means of board slide) and display drawing objects in the planar map (a portion (b) of FIG. 18).

Figure 19:
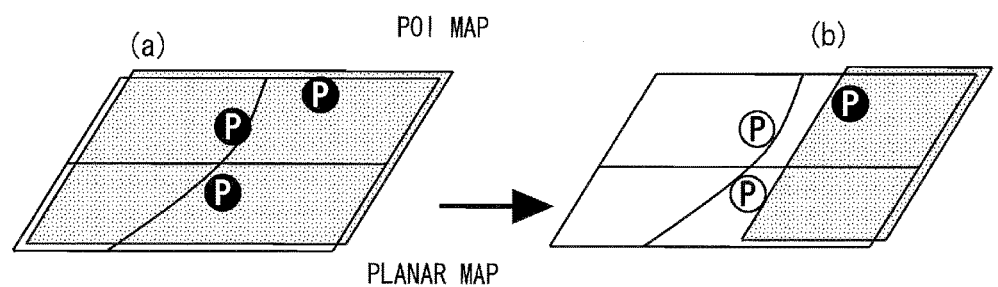
FIG. 19 is a view illustrating behavior according to a specific example, of the map display device.

In FIG. 19, a first drawing picture is a planar road map, and a second drawing picture (having a transparent background color in the figures) is a POI map displaying specific icons and the like indicating peripheral points of interest (POIs) such as spots corresponding to buildings and facilities on the map. The POI map is overlapped on the planar map (a portion (b) of FIG. 19). The second background drawing object is transparent in this example, although the second background drawing object in the figures is colored in order to clarify the difference from the first background drawing object.

By touching the POI map and shifting a finger on the display screen, it is possible to slide the POI map (sliding out by means of curtain slide) and display drawing objects in the planar map (a portion (b) of FIG. 19). FIG. 19 is configured such that the unhighlighted icons on the planar map are made visible when the POI map is slid.

MODIFICATION EXAMPLES

The input/display unit 1 integrally includes an input unit that receives user input information and a display unit that displays a drawing picture in accordance with the received input information and behavior control by the controller 4. The device can alternatively include separate configurations for achieving these functions. Furthermore, displayed information is not limited to a drawing object in a map drawing picture. It is possible to display various information in accordance with demand of a user.

When the touch panel is adopted to change overlap between drawing pictures in accordance with gesture operation as in the present embodiment, operation is facilitated. More specifically, in a conventional map display device, control is executed by touching an operation icon displayed on a touch panel or by handling a mechanical switch or a dial. The conventional device had a user interface not necessarily achieving fine usability. In contrast, the present invention adopts gesture operation that is typically applied to a portable terminal having a touch panel such as a so-called smartphone. This achieves a user interface of fine usability.

The present invention is thus effectively utilized when operation time is limited, in such a case of operating a map display device equipped on a vehicle. Furthermore, the present invention has high flexibility in change of overlap (e.g. shift directions and effects upon introduction and removal) and satisfies demand including an entertainment aspect for a user.

It is also possible to provide the user-friendly input modes for a user who is used to operate a touch panel and the like.

The input/display unit 1 can be embodied by not only an ordinary touch panel but also a three-dimensional touch panel that is of a capacitance detection type and is capable of detecting approach and contact of a finger.

The first information storage 2 and the second information storage 3 can be provided as separate storage media as shown in FIG. 1, or can be included in one storage medium. The first information storage 2 and the second information storage 3 can alternatively communicate with an external storage medium to obtain a drawing object related to map information or map relevant information, or the like.

The sliding method according to the present embodiment is exemplification. A drawing picture can be updated in the slide display mode by any method other than the sliding method of the present embodiment.

The upper overlapped map and the lower map are not necessarily equal in scale. The upper drawing picture and the lower drawing picture do not necessarily have equal sizes. The drawing pictures are not necessarily large enough to cover the entire display screen.

Examples of the first and second drawing pictures include a planar map and a POI map, a planar map and a map displaying information on peripheral facilities (a car park, a zoo, etc.), a planar map and a map displaying pedestrian paths, a planar map and a public transportation facilities map (a line map, etc), a planar map and a map displaying infrastructure facilities of gas, water, electricity, manholes, and the like, a planar map and a map displaying weather information (including pollen information, yellow sand information, wind speed information, and radiation information), a planar map and a map displaying crime relevant information on crime occurrence spots (e.g. car break-in), occurrence possibility, risk degrees, and the like, a planar map and a map displaying animal relevant information on animal appearance spots, appearance possibility, and the like, a planar map and a map displaying information of cherry blossom front, tinted autumnal leaves, or the like.

In a drawing picture including a drawing object related to such map relevant information, the drawing object related to character information can be displayed on the transparent drawing picture. The drawing objects displayed in the first drawing picture and the second drawing picture can be switched with each other.

Drawing objects related to information displaying setting and the like in common with the upper drawing picture out of drawing objects displayed in the lower drawing picture can be displayed regardless of update of the upper drawing picture.

The number of drawing pictures to be overlapped is not limited to two but can be three or more. In the case of overlapping three or more drawing pictures, a drawing object masks at least one other drawing object in a portion where one of the drawing pictures is overlapped with at least one of the remaining two drawing pictures. When performing slide operation to one of the drawing pictures, the drawing picture can be slid independently from the other drawing pictures, or any of the other drawing pictures can be slid along therewith.

Effects

A map display device according to the embodiment of the present invention includes an input/display unit 1 that receives input of user operation related to display of a drawing picture and displays a first drawing object related to map information in a first drawing picture and a second drawing object related to map relevant information in a second drawing picture; and a controller 4 that controls an overlapping state between the first drawing picture and the second drawing picture in accordance with input of user operation received by the input/display unit 1 and outputs, to the input/display unit 1, a picture in which one of the first and second drawing objects masks the other one in a portion where the first and second drawing pictures are overlapped with each other. This configuration facilitates comprehension of relevance between the drawing objects in the drawing pictures. More specifically, when one of the drawing objects masks the other one, it is possible to inhibit display of drawing objects other than the drawing objects, of which relevance needs to be comprehended, or masking is canceled to display with other drawing objects. In these manners, it is possible to display drawing objects, of which relevance needs to be comprehended, in display regions close to each other.

Particularly when one of the first and second drawing objects relates to map information and the other one relates to map relevant information, it is possible to easily comprehend relevance between a drawing object related to, other than the information indicated in an ordinary map, such as topography, administrative districts, buildings, and roads, the map relevant information that is added in association with a position on the map, and a drawing object related to the map information.

In the map display device according to the embodiment of the present invention, the controller 4 slides one of the first and second drawing pictures relatively to the other one to successively change the overlapping state between the first and second drawing pictures, so that the second drawing object, of which relevance with the first drawing object needs to be comprehended, can be displayed while successively changing on the first drawing picture. This configuration facilitates visual comparison between the first and second drawing objects.

In the map display device according to the embodiment of the present invention, the sliding includes board slide by which the drawing object in the drawing picture is shifted in a slide direction in association with the sliding of the drawing picture, and curtain slide by which the drawing object displayed at the input/display unit 1 is not shifted. It is thus possible to easily comprehend the relevance between the drawing objects in the drawing pictures.

Particularly when the drawing object in the second drawing picture is shifted in the slide direction in association with the sliding of the drawing picture, the second drawing object, of which relevance with the first drawing object needs to be comprehended, can be displayed while successively shifting near the first drawing object. This configuration facilitates visual comparison between the first and second drawing objects. In other words, upon comprehension of the relevance between the first and second drawing objects, a user does not need to remember respective features and compare the drawing objects.

Furthermore, by sliding without changing the position of the drawing object displayed at the input/display unit 1, in other words, without changing the positional relationship of the drawing object in the second drawing picture to the drawing object in the first drawing picture, the second drawing object, of which relevance with the first drawing object needs to be comprehended, can be always displayed immediately above the first drawing object. The corresponding first drawing object can be displayed at the position where overlap of the second drawing object is removed. It is thus possible to easily comprehend the relevance between the first and second drawing objects.

In the map display device according to the embodiment of the present invention, when each of the first and second drawing objects is information related to a position of a vehicle (mobile body) on a map, a travel route of the vehicle, or a destination of the vehicle, drawing pictures displaying a drawing object related to map information and a drawing object related to map relevant information, respectively, can be overlapped with each other and displayed in a peripheral map of the current position of the vehicle or the like. Control on the overlapping state enables easy comprehension of the relevance between the drawing objects thereby to further enhance the convenience.

The planar map of the periphery of the current position of the vehicle or the like and a map displaying weather information around a spot on a set travel route can be overlapped with each other and displayed. Control on the overlapping state enables easy comparison between a drawing object related to map information at the current position of the vehicle and a drawing object related to weather information at the spot on the travel route. It is thus possible to utilize as a measure for determination of route change or the like.

The planar map of the periphery of the current position of the vehicle or the like and a map displaying weather information around a set destination can be overlapped with each other and displayed. By controlling the overlapping state, it is possible to easily refer to a drawing object related to weather information at the destination while obtaining a drawing object related to map information at the current position of the vehicle. It is thus possible to utilize as a measure for consideration of a schedule after arrival at the destination.

In the map display device according to the embodiment of the present invention, the first drawing picture has a preset first attention point, the second drawing picture has a preset second attention point, and upon control of the overlapping state between the first drawing picture and the second drawing picture, a display position of the first attention point and a display position of the second attention point always coincide with each other (curtain slide or the like), or the display position of the first attention point and the display position of the second attention point coincide with each other only when a predetermined overlapping state is established (board slide or the like). It is possible to display the attention points, of which relevance needs to be comprehended by a user, at positions close to each other on the display screen, or only one thereof can be displayed. Comprehension of the relevance is thus facilitated.

In the map display device according to the embodiment of the present invention, when the second drawing picture is smaller than the first drawing picture, in the completely overlapped state, entirety of the second drawing picture is overlapped with a predetermined range of the first drawing picture. It is thus possible to achieve a state where the second drawing object entirely masks the corresponding first drawing object.

In a map display method according to the embodiment of the present invention, a first drawing picture displays at least one first drawing object, a second drawing picture displays at least one second drawing object, one of the first and second drawing objects includes a drawing object related to map information and the other one includes a drawing object related to map relevant information, the first and second drawing pictures are equal or different in size, and the map display method includes the steps of: (a) receiving input of user operation related to display of a drawing picture, (b) displaying the plurality of drawing pictures, and (c) prior to the step (b), controlling an overlapping state between the first drawing picture and the second drawing picture in accordance with input of user operation received in the step (a), and masking one of the first and second drawing objects with the other one in a portion where the first drawing picture and the second drawing picture are overlapped with each other. This configuration facilitates comprehension of the relevance between the drawing objects in the drawing pictures.

In the present invention, any constituent element according to the present embodiment can be modified or removed within the scope of the invention.

The present invention has been described in detail. The above description merely exemplifies all aspects and the present invention is not to be limited thereto. Countless modification examples not mentioned herein are to be expected without being excluded from the scope of the present invention.

DESCRIPTION OF REFERENCE SIGNS

1: input/display unit,
2: first information storage,
3: second information storage,
4: controller,
401: input analyzer,
402: overall controller,
403: first information drawing unit,
404: first drawing picture holding unit,
405: second information drawing unit,
406: second drawing picture holding unit,
407: synthetic drawing unit,
408: synthetic drawing picture holding unit

The invention claimed is:

1. A map display device that displays a plurality of drawing pictures including a first drawing picture and a second drawing picture in an at least partially overlapping manner, said first drawing picture displaying at least one first drawing object and having a preset first attention point, said second drawing picture displaying at least one second drawing object and having a preset second attention point, wherein the attention points are points to be compared when the user refers to both the first drawing picture and the second drawing picture, one of said first and second drawing objects displaying a map displaying a geographical area as map information and the other one displaying map relevant information, and the map display device comprising:
an input unit that receives input of user operation related to display of a drawing picture; and
a controller that controls an overlapping state between said first drawing picture and said second drawing picture in accordance with input of user operation received by said input unit and outputs, to a display unit, a picture in which one of said first and second drawing objects masks the other one in a portion where said first drawing picture and said second drawing picture are overlapped with each other, and
wherein said controller slides one of said first and second drawing pictures relatively to the other one so as to successively change the overlapping state between said first and second drawing pictures with a board slide by which said first drawing picture and its associated drawing object is shifted in a slide direction in association with the sliding of said drawing picture to change the overlap of said first and second drawing pictures on a display without changing the position of the first display object with respect to the first drawing picture
upon control of the overlapping state between said first drawing picture and said second drawing picture, said first attention point and said second attention point always coincide with each other, or said first attention point and said second attention point coincide with each other only when a predetermined overlapping state is established;
wherein as the controller performs the board slide, the first attention point approaches the second attention point.

2. The map display device according to claim 1, wherein said input unit and said display unit are integrally formed as a display device provided with a touch panel.

3. The map display according to claim 1 wherein said map display device is equipped on a mobile body, and
one of said first drawing object and said second drawing object displays information related to one of a position on a map of said mobile body, a travel route of said mobile body, and a destination of said mobile body.

4. The map display device according to claim 1, wherein
said controller successively controls the overlapping state from a completely overlapped state to a completely displaced state between said first and second drawing pictures.

5. The map display device according to claim 4, wherein
when said second drawing picture is smaller than said first drawing picture,
in said completely overlapped state, entirety of said second drawing picture is overlapped with a predetermined range of said first drawing picture.

6. The map display device according to claim 1, wherein said display unit includes a display screen, and
the size of said first drawing picture corresponds to entirety of said display screen and the size of said second drawing picture corresponds to entirety or part of said display screen.

7. The map display device according to claim 1 wherein the map relevant information includes at least one of traffic jam data or line data.

8. The map display device according to claim 1 wherein said first and second drawing pictures are the same size.

9. The map display device of claim 1 wherein one of the first and second attention points is a current position of the user.

10. The map display device of claim 1 wherein one of the first and second attention points is a destination on the respective drawing picture.

11. A method of processing map data for display on a map display to enable display of a plurality of drawing pictures including a first drawing picture and a second drawing picture in an at least partially overlapping manner,
said first drawing picture displaying at least one first drawing object and having a preset first attention point,
said second drawing picture displaying at least one second drawing object and having a preset second attention point,
wherein the attention points are points to be compared when the user refers to both the first drawing picture and the second drawing picture,
one of said first and second drawing objects displaying a map of a geographical area as map information and the other one displaying map relevant information, and
said first and second drawing pictures being equal or different in size,
the method including the steps of:
(a) receiving input of user control operations related to display of a drawing picture,
(b) providing map information and map relevant information for display;
(c) processing said map information and said map relevant information under control of the user control operations to produce display information;
(d) providing the display information to the display to display said map information and said map relevant information as a plurality of drawing pictures, and
said step of processing controlling an overlapping state between said first drawing picture and said second drawing picture in accordance with input of user operations received in said step (a), and masking one of said first and second drawing objects with the other one in a portion where said first drawing picture and said second drawing picture are overlapped with each other, and
in said step (c), one of said first and second drawing pictures is slid relatively to the other one so as to successively change the overlapping state between said first and second drawing pictures by enlarging one of said first and second drawing pictures while reducing the other one of said first and second drawing pictures, the one of said first and second drawing pictures being slid over the other in a board slide by which said drawing object in said drawing picture is shifted in a slide direction in association with the sliding of said drawing picture without changing the position of the first display object with respect to the first drawing picture, and
upon control of the overlapping state between said first drawing picture and said second drawing picture, said first attention point and said second attention point always coincide with each other, or said first attention point and said second attention point coincide with each other only when a predetermined overlapping state is established,
wherein, when the board slide is performed in said step (c), the first attention point approaches the second attention point.

12. The method of claim 11 wherein one of the first and second attention points is a current position of the user.

\* \* \* \* \*